United States Patent [19]
Sasaki et al.

[11] Patent Number: 5,410,650
[45] Date of Patent: Apr. 25, 1995

[54] MESSAGE CONTROL SYSTEM FOR DATA COMMUNICATION SYSTEM

[75] Inventors: Takatsugu Sasaki; Akira Kabemoto; Hajime Takahashi; Horihide Sugahara, all of Kawasaki, Japan

[73] Assignee: Fujitsu Limited, Kanagawa, Japan

[21] Appl. No.: 859,319

[22] PCT Filed: Sep. 27, 1991

[86] PCT No.: PCT/JP91/01307

§ 371 Date: May 28, 1992

§ 102(e) Date: May 28, 1992

[87] PCT Pub. No.: WO92/06431

PCT Pub. Date: Apr. 16, 1992

[30] Foreign Application Priority Data

Sep. 28, 1990 [JP] Japan ................... 2-259393
Sep. 28, 1990 [JP] Japan ................... 2-259394
Sep. 28, 1990 [JP] Japan ................... 2-259395

[51] Int. Cl.[6] ........................................ G06F 13/00
[52] U.S. Cl. ............................. 395/200; 395/250; 364/284; 364/284.3; 364/240; 364/DIG. 1
[58] Field of Search ............. 395/200, 275, 575, 250

[56] References Cited

U.S. PATENT DOCUMENTS 4,709,325 11/1987 Yajima ..................... 364/200
5,084,816 1/1992 Boese et al. ................ 395/575

FOREIGN PATENT DOCUMENTS 55-37642   3/1980  Japan .
58-158732  9/1983  Japan .
58-159142  9/1983  Japan .
61-11867   1/1986  Japan .
61-95643   5/1986  Japan .
62-125455  6/1987  Japan .

Primary Examiner—Robert L. Richardson
Attorney, Agent, or Firm—Staas & Halsey

[57] ABSTRACT

A message control system for a data communication system which takes the form of a loosely coupled multi-processing system in which a plurality of processing modules respectively having a memory unit are coupled to each other via a system bus. In the message control system, each processing module (10, 40) includes a central processing unit (11, 41), a memory unit (12, 42) and a connection unit (13, 43). The connection unit (13, 43) includes at least a logical transmitting port (21, 51) for transmitting a message, a logical receiving port (22, 53) for receiving a message, a transmission system connecting unit (23), a reception system connecting unit (24), a transmitting side fault generation monitoring unit (25) and a receiving side fault generation monitoring unit (26).

34 Claims, 27 Drawing Sheets

FIG. 11

| 0 . . . . . . . 8 . . . . . . . 16 . . . . . . . 24 . . . . . 31 | |
|---|---|
| DSA \| O\|O\|O\|O | SPDSA |
| M\|M | SPODF |
| I\|N | SPFCP |
| CDSA \| STATE | SPOPS |
| CSC | SPCST |

FIG. 12

| 0 . . . . . . . 8 . . . . . . . 16 . . . . . . . 24 . . . . . 31 | |
|---|---|
| DSA \| O\|O\|O\|O | RPDSA |
| M\|M | RPODF |
| I\|N | RPFCP |
| CDSA \| STATE | RPOPS |
| CSC | RPCST |
| SID | RPSSI |

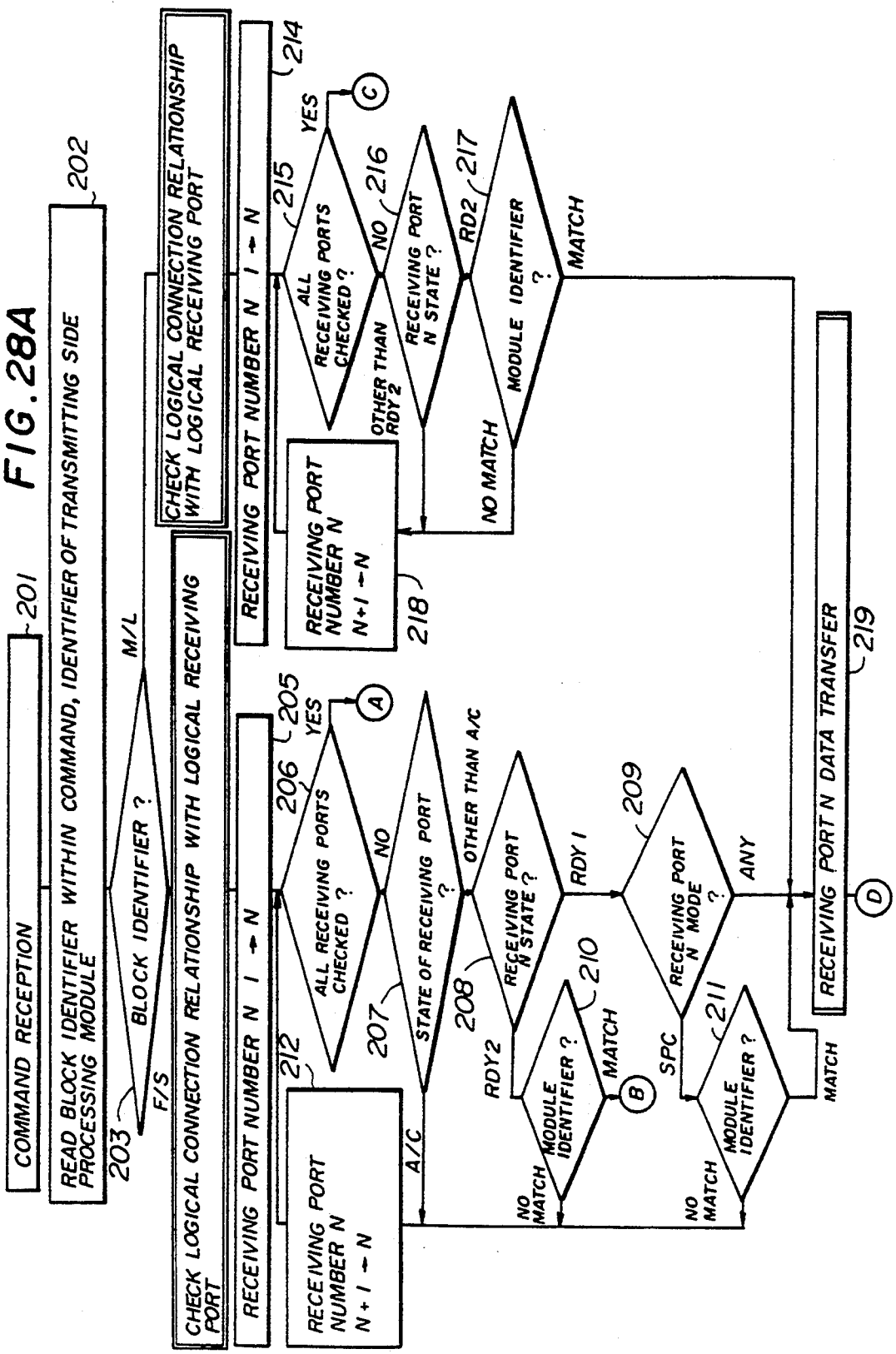

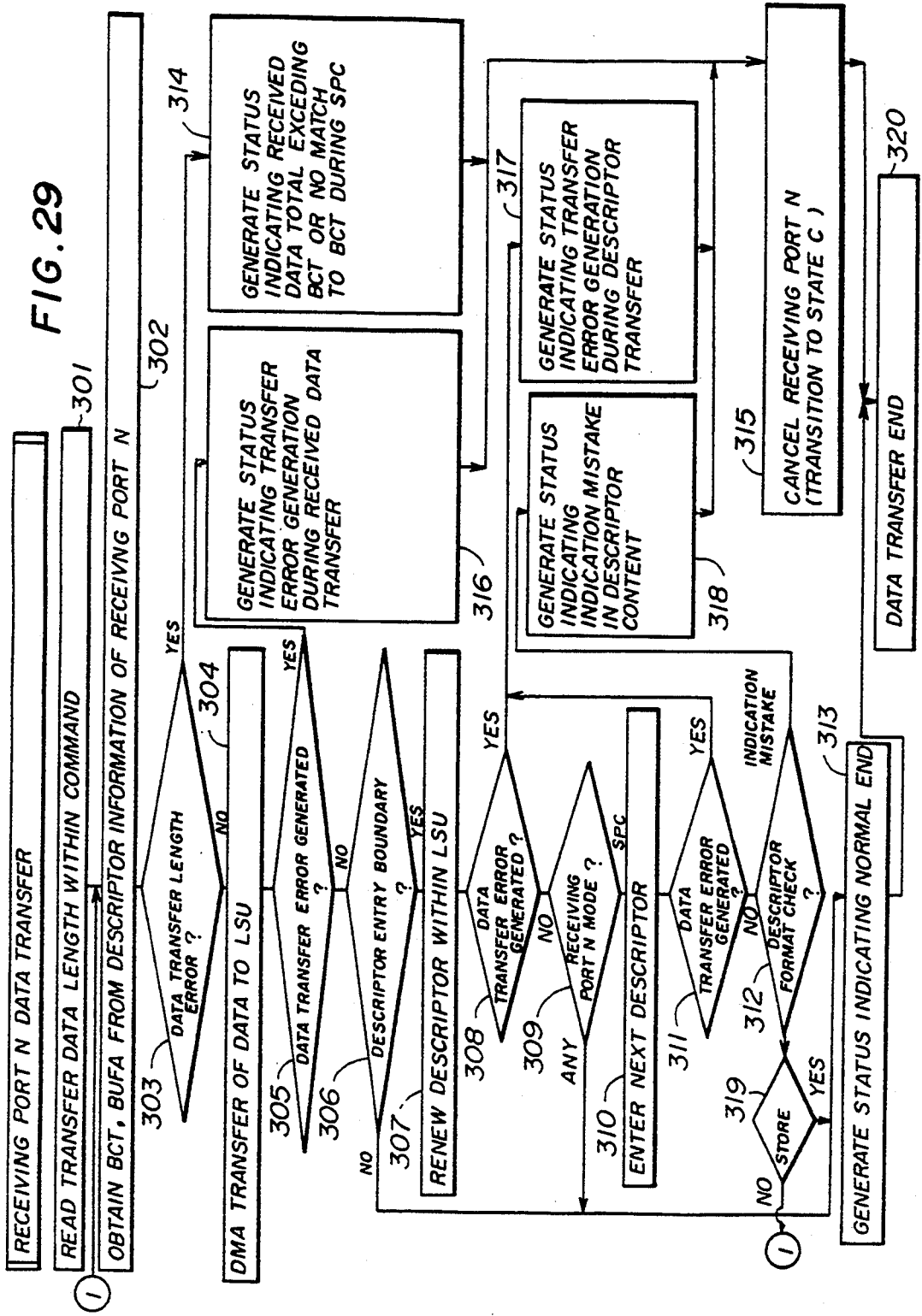

MESSAGE CONTROL SYSTEM FOR DATA COMMUNICATION SYSTEM

BACKGROUND OF THE INVENTION

1. Field of the Invention

The present invention generally relates to message control systems for data communication systems, and more particularly to a system for controlling messages among a plurality of processing modules which form a loosely coupled multiprocessing (LCMP) system.

In data communication systems, one of the most important factors is to realize a reliable system having a large processing capability. In order to satisfy this demand, multiprocessor systems have been used recently. As one of the system configurations of the multiprocessor system, there is the loosely coupled multiprocessing (LCMP) system in which a plurality of independent computers are coupled by channel-to-channel adapters and the like to enable a job input and execution by any of the computers.

When implementing a message communication in the loosely coupled multiprocessing system, it is necessary to realize a message communication which is initiated on the transmitting side, and appropriately cope with the various control end requests issued during the communication by the data processing function. In addition, it is necessary to realize a message control system which can simply set and release logical connections.

2. Description of the Related Art

As a data communication system having a microprocessor structure, a tightly coupled multiprocessing (TCMP) system having a system configuration in which a plurality of microprocessors share a single memory device was widely used conventionally. However, the loosely coupled multiprocessing system system in which each processor has its own memory device is more popular to improve the system performance when increasing the number of processor modules.

According to the message control system of the loosely coupled multiprocessing system, the data processing part which is the software within the processing module at the origin of the transmission request conventionally executes the message communication via the hardware which manages the communication process or, the transmission and reception process is started after the software of the transmitting side processing module and the software of the receiving side confirm the issuance of the message transmission and reception process.

In addition, the process of setting the logical connection relationship between the transmitting side processing module and the receiving side processing module is executed according to the communication process which is executed prior to the message communication of the message which is the subject of the communication. On the other hand, the release process of the above logical connection relationship is executed according to the communication process which is executed after the message communication ends.

In the conventional message control system, if the message communication is executed via the software, the software cannot execute the original data processing during the message communication. In addition, in the case of the conventional system which confirms the issuance of the message transmission and reception process at the transmitting side and the receiving side, the progress of the data processing is delayed.

Furthermore, according to the conventional message control system, it is necessary to execute the communication process for setting and releasing the logical connection relationship respectively before and after the message communication. As a result, the control process for setting and releasing the logical connection relationship becomes complex.

Moreover, the conventional system cannot transmit the message when the transmitting side processing module wishes to transmit. Even if the hardware managing the signal processing were to carry out the message communication totally without the need for software intervention so as to make the transmitting side initiated message communication and the transmitting side processing module transmit the message when it wishes, it becomes impossible to cope with the forced end request of the message communication required by the software.

SUMMARY OF THE INVENTION

It is an object of the present invention is to provide a message control system for a data communication system, applied to a message communication between loosely coupled processing modules, and capable of making a transmitting side initiated message communication.

It is another object of the present invention is to provide a message control system for a data communication system, which can appropriately cope with the various forced end requests issued by the data processing function during the communication and the setting and the releasing of the logical connection relationship between the transmitting side and receiving side processing modules when carrying out a transmitting side initiated message control.

In order to achieve the above objects, the present invention provides a message control system for a data communication system which employs a loosely coupled multiprocessing system structure in which a plurality of processing modules having a central processing unit, a memory unit and a connection unit which forms an interface between the memory unit and a system bus are connected to each other via the system bus. The memory unit of the processing module includes a data processing part which is a software running on the central processing unit, and a buffer in which a transmitting message is expanded and stored. The processing module connection unit at least includes a logical transmitting port for successively reading out the message expanded in the buffer and transmitting the same to a logically connected receiving side processing module, a logical receiving port for successively storing the message received from a transmitting side processing module into the buffer of its own memory unit, a transmission system connecting means for setting or releasing the logical connection between the logical transmitting port and the processing module at a communication destination, a reception system connecting means for setting or releasing the logical connection between the logical receiving port and the processing module at the communication destination, a transmitting side fault generation monitoring means, and a receiving side fault generation monitoring means.

The above transmitting side fault generation monitoring means releases the logical connection of the transmission system connecting means and notifies the fault generation to the data processing part of its own processing module if a fault related to the transmitting message or a fault related to the reception of a status indicating a message reception result from the receiving side processing module is generated when its own processing module is the message transmitting side. In addition, the receiving side fault generation monitoring means releases the logical connection of the reception system connecting means and notifies the fault generation to the data processing part of its own processing module if a fault is generated during processing of the received message or a fault related to the transfer of a status related to the message reception result is generated when its own processing module is the message receiving side.

According to the present invention, it is possible to make a transmitting side initiated message communication in which the message can be transmitted to a desired processing module when desired by the processing of the connection unit when the data processing part of the transmitting side processing module simply issues a message transmission request in the loosely coupled multiprocessing system.

In addition, a further aspect of the present invention further provides in the connection unit a detecting means for detecting a forced end indication from the data processing part, a transmission control means for forcibly ending the transmission process of the logical transmitting port when the detecting means detects the forced end indication of the transmission process, and a reception forced end means for forcibly ending the reception process of the logical receiving port when the detecting means detects the forced end indication of the reception process.

According to the present invention, when realizing the message communication between the processing modules in the transmitting side initiated manner without the intervention of software, it is possible to appropriately cope with the various forced end requests issued by the software which becomes the source of the communication processing request during the communication. For this reason, it is possible to promptly execute an appropriate data processing in the data communication system which employs the loosely coupled multiprocessing system structure.

Furthermore, another aspect of the present invention provides in the connection unit first and second connection information managing means for managing identifiers of the processing modules having the logical connection relationships to the logical transmitting port and the logical receiving port, a block identifier adding means for adding to the message block a block identifier for identifying the block sequence of the transmitting message block, and an anticipated block identifier managing means for managing an anticipated value of the block identifier of the received message of the logical receiving port.

According to the present invention, the transmitting side processing module can set and release the logical connection relationship between the receiving side processing module in an accurate and simple manner without using a special communication procedure. In addition, the receiving side processing module can also set and release the logical connection relationship between the receiving side processing module in an accurate and simple manner without using a special communication procedure.

BRIEF DESCRIPTION OF THE DRAWINGS

FIG. 5A shows the input and output signals of the physical transmitting port and FIG. 5B is a diagram of the state transition;

FIG. 6A shows the input and outputs signals and FIG. 6B is a diagram of the transition state;

FIG. 11 is a diagram of an example of a data written into a control register of a logical transmitting port;

FIG. 12 is a diagram of an example of a data written into a control register of a logical receiving port;

FIGS. 28A and 28B are flow charts for explaining processing operations at the time of a command reception;

FIG. 29 is a flow chart for explaining a data transfer operation in FIG. 21;

DESCRIPTION OF PREFERRED EMBODIMENTS

Figure 1A:
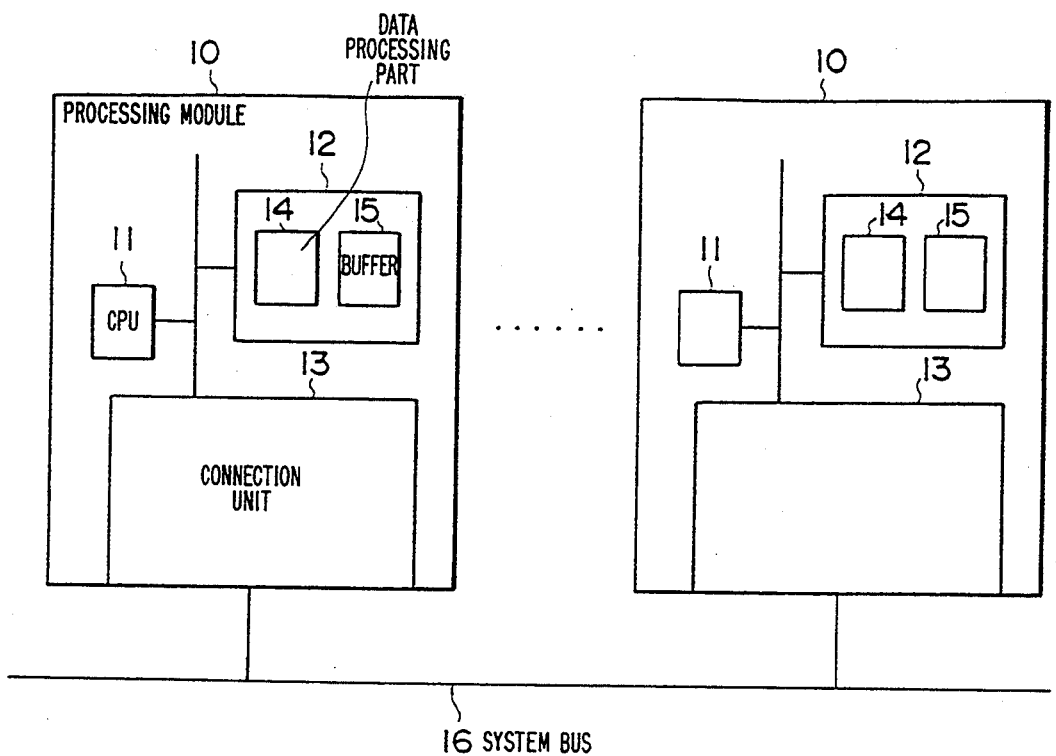
FIGS. 1A and 1B are a block diagrams of a basic system according to the present invention.

In FIG. 1(A) which is a block diagram of the principle of the present invention, a plurality of processing modules 10 are connected to each other via a system bus 16 and form the above described loosely coupled multi-processing system. Each processing module 10 is made up of a central processing unit 11, a memory unit 12 which is accessible only by the central processing unit 11, and a connection unit 13 which is provided to manage a communication process with other processing modules 10.

The memory unit 12 is made up of a data processing part 14, a buffer 15 and the like as shown in FIG. 1(A).

The data processing part 14 is formed by a software which is expanded in the memory unit 12 and runs on the central processing unit 11, and executes a predetermined data processing according to data information exchanged by message communication with other processing modules 10. The write in and read out of the transmitting message and the receiving message with respect to the buffer 15 is controlled by the central processing unit 11.

Figure 1B:
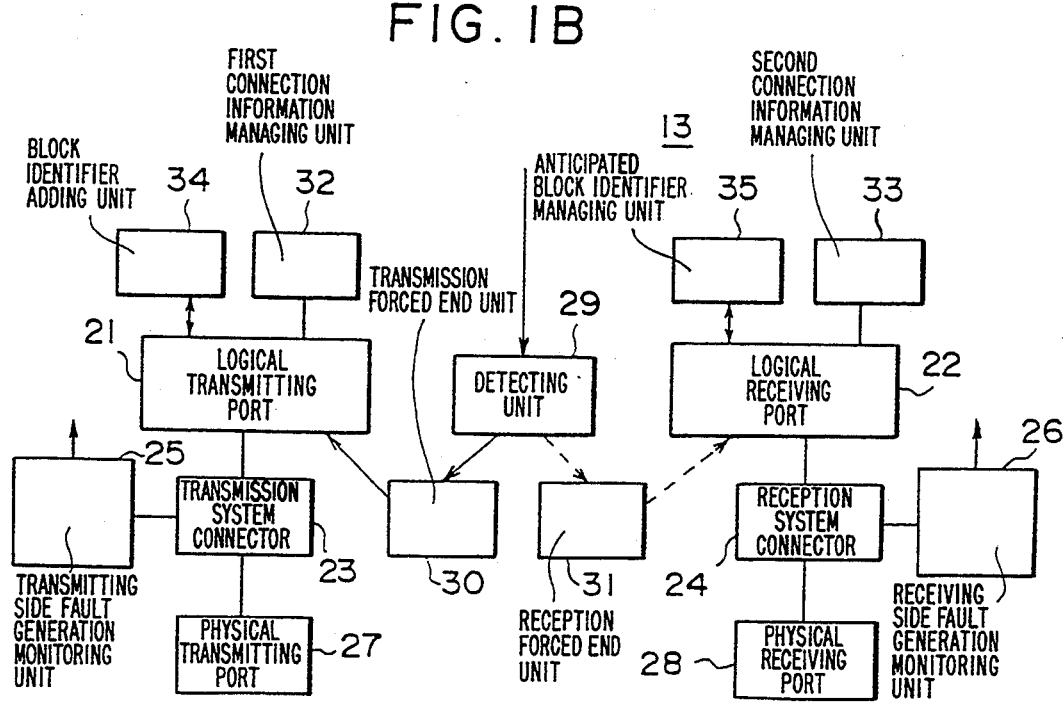

The connection unit 13 has the structure shown in FIG. 1(B). As shown in FIG. 1(B), the connection unit 13 is made up of at least a logical transmitting port 21, a logical receiving port 22, a transmission system connecting means 23, a reception system connecting means 24, a transmitting side fault generation monitoring means 25, a receiving side fault generation monitoring means 26, a physical transmitting port 27 and a physical receiving port 28.

The logical transmitting port 21 is provided as a communication port for the data processing part 14, and successively reads out the message expanded in the buffer 15 and transmits the same to the logical connected receiving side processing module 10. The logical receiving port 22 is provided as a communication port for the data processing part 14, and successively stores the message received from the logical connected transmitting side processing module 10 into the buffer 15 within its own memory unit 12.

The transmission system connecting means 23 sets or releases the logical connection between the processing module 10 at the communicating destination via the logical transmitting port 21 and the physical transmitting port 27. The reception system connecting means 24 sets or releases the logical connection between the logical receiving port 22 and the physical receiving port 28 within the processing module 10 at the communicating destination.

The transmitting side fault generation monitoring means 25 releases the logical connection of the transmission system connecting means 23 and notifies the fault generation to the data processing part 14 of its own processing module 10 if a fault related to the transmitting message is generated or a fault related to a status reception which indicates the result of the message reception from the receiving side processing module 10 is generated when its own processing module 10 is the message transmitting side.

In addition, the the receiving side fault generation monitoring means 26 releases the logical connection of the reception system connecting means 24 and notifies the fault generation to the data processing part 14 of its own processing module 10 if a fault related to the receiving message is generated or a fault related to a status transfer which indicates the result of the message reception is generated when its own processing module 10 is the message receiving side.

As shown in FIG. 1(B), the connection unit 13 includes a detecting means 29 for detecting a forced end indication from the data processing part 14 (FIG. 1(A)), a transmission forced end means 30 for forcibly ending the transmission process of the logical transmitting port 21 if the forced end indication of the transmission process is detected by the detecting means 29, and a reception forced end means 31 for forcibly ending the reception process of the logical receiving port 22 if the forced end indication of the reception process is detected by the detecting means 29.

Furthermore, as shown in FIG. 1(B), the connection unit of the present invention includes a first connection information managing means 32 for managing an identifier of the receiving side processing module 10 which has the logical connection relationship to the logical transmitting port 21, a second connection information managing means 33 for managing an identifier of the transmitting side processing module 10 which has the logical connection relationship to the logical receiving port 22, a block identifier adding means 34 for adding a block identifier to a message block which is transmitted via the logical transmitting port 21 for identifying a block value of this message block, and an anticipated block identifier managing means 35 for managing an anticipated value of the block identifier of the receiving message of the logical receiving port 22.

Next, a description will be given of the effects of the principle structure of the present invention shown in FIG. 1(A) and (B). In the present invention, if it is necessary to transmit a message, the data processing part 14 of the transmitting side processing module 10 requests a message transmission process to the logical transmitting port 21 of the connection unit 13. Responsive to this request, the logical transmitting port 21 of the transmitting side processing module 10 reads the message to be transmitted from the buffer 15 of its own processing module 10 in sequence depending on the transfer block unit of the physical transmitting port 27 and transmits this message to the system bus via the physical transmitting port 27.

On the other hand, if the logical receiving port 22 of the receiving side processing module 10 detects that it is specified as the destination of the message block which is received from the transmitting side processing module 10 via the physical receiving port 28, the logical receiving port 22 of the receiving side processing module 10 executes a reception process of the message communication by storing the received message in sequence into the buffer 15 of its own processing module 10.

Hence, in the present invention, a transmitting side initiated message communication in which the message to be transmitted can be transmitted to the processing module 10 of the communicating destination at an arbitrary time can be executed by the processing of the connection unit 13 by simply issuing the message transmission request from the data processing part 14 of the transmitting side processing module 10.

The transmitting side fault generation monitoring means 25 of the transmitting side processing module 10 releases the logical connection of the transmission system connecting means 23 if an internal fault related to the transmitting message processing is generated during execution of the message communication, and also notifies this fault generation to the data processing part 14 of its own processing module 10. As a result, the data processing part 14 makes the logical transmitting port 21 transmit a protocol violation message block.

On the other hand, if this protocol violation message block is received by the logical receiving port 22, the receiving side fault generation monitoring means 26 releases the logical connection of the reception system connecting means 24 and also notifies this reception result to the data processing part 14.

In addition, if the fault is generated on the system bus 16 during the transmitting message transfer, the transmitting side fault generation monitoring means 25 releases the logical connection of the transmission system connecting means 23 and also notifies this fault generation to the data processing part 14 of its own processing module 10. Accordingly, the data processing part 14 receives the notification of the fault generation and makes the logical transmitting port 21 transmit the protocol violation message block.

On the other hand, if this protocol violation message block is received by the logical receiving port 22, the receiving side fault generation monitoring means 26 releases the logical connection of the reception system connecting means 24 and also notifies this reception result to the data processing part 14.

The receiving side fault generation monitoring means 26 within the receiving side processing module notifies the fault generation to the data processing part 14 within its own processing module when an internal fault related to the processing of the received message is generated, transmits a status indicating the fault generation to the message transmitting side processing module 10 via the logical transmitting port 21, and releases the logical connection of the reception system connecting means 24. Hence, the transmitting side fault generation monitoring means 25 releases the logical connection of the transmission system connecting means 23 according to the detection result of the above status.

If a fault is generated on the system bus 16 during the status transfer, the receiving side fault generation monitoring means 26 within the receiving side processing module releases the logical connection of the reception system connecting means 24 and also notifies this fault generation to the data processing part 14 within its own processing module. On the other hand, if the status is not input for a predetermined time, the connection unit 14 within the message transmitting side processing module 10 notifies the fault generation to the data processing part 14 within its own processing module and also releases the logical connection of the transmission system connecting means 21.

Further, if an internal fault related to the processing of the received message is generated after the status transfer, the receiving side fault generation monitoring means 26 within the receiving side processing module notifies the generation of the internal fault to the data processing part 14 within its own processing module and requests a forced end of the data processing part 14. Thereafter, when the protocol violation of the message block received by the receiving side processing module 10 is detected, the logical connection of the reception system connecting means 24 is released, and the protocol violation status is transmitted to the message transmitting side processing module 10. Hence, the transmitting side fault generation monitoring means 25 within the transmitting side processing module releases the logical connection of the transmission system connecting means 23 according to the status detection result, and notifies the fault generation to the data processing part 14 within its own processing module.

The receiving side fault generation monitoring means 26 within the receiving side processing module monitors the state of the reception process of the logical receiving port 22, and releases the logical connection state of the reception system connecting means 24 when the predetermined time elapses and the message block waiting state is reached.

Accordingly, when the fault is generated during execution of the transmitting side initiated message communication, the logical connection relationship can be released quickly by the processing modules 10 of both the transmitting and receiving sides.

In addition, in the present invention, when the data processing part 14 which is the reception request source issues a forced end indication of the reception process during execution of the message communication, the detecting means 29 of the receiving side processing module 10 immediately executes a process to end the reception process of the logical receiving port 22 if the issued indication indicates an immediate forced end indication. On the other hand, if the indication indicates a non-immediate forced end indication, the detecting means 29 ends the reception process of the logical receiving port 22 at the end point of the reception process when the message breaks. As a result, the present invention can appropriately cope with the various forced end requests issued during communication by the software which becomes the communication process request source.

In addition, according to the present invention, during the execution of the message transmission process, the block identifier adding means 34 of the transmitting side processing module 10 adds a block identifier which indicates a first block if the transfer block of the transmitting message is at the start. A block identifier which indicates a middle block is added if the transfer block is at the intermediate part, and a block identifier which indicates a last block is added if the transfer block is at the end. A block identifier which indicates a single block is added if the transfer block is a single block.

The first connection information managing means 32 manages the block identifier of the receiving side processing module 10 which has the logical connection relationship during the message transmission from the first block to the last block, so as to support the message transmission process to the receiving side processing module 10 which has this logical connection relationship.

On the other hand, when the logical receiving port 22 of the receiving side processing module 10 detects that it is specified as the destination of the message which is transmitted from the transmitting side processing module 10 and that the transfer block of this transmitted message is the first block, the logical receiving port 22 sets the logical connection relationship by registering in the second connection information managing means 33 the identifier of the transmitting side processing module 10 which is added to the message. Thereafter, the message which is transmitted from the transmitting side processing module 10 which has this logical connection relationship is stored in the buffer 15 of its own processing module in sequence.

When the last block transmitted from the transmitting side processing module 10 is detected, the identifier of the transmitting side processing module 10 registered in the second connection information managing means 33 is deleted, and the message reception process is ended by releasing the logical connection relationship.

When executing this message reception process, the anticipated block identifier managing means 35 of the receiving side processing module 10 manages and indicates whether the transfer block which is next transmitted is the middle block or the last block. In response to this indication, the logical receiving port 22 recognizes the generation of the fault and puts the logical connection relationship to an abnormal end if the first block or the single block is transmitted from the transmitting side processing module 10 which has the logical connection relationship.

Accordingly, by use of the present invention, it is possible to accurately and simply execute the process of controlling the setting and releasing of the logical connection relationship between the transmitting side and the receiving side, including the case where the abnormal state is generated, when executing the message communication process which is transmitting side initiated.

Figure 2:
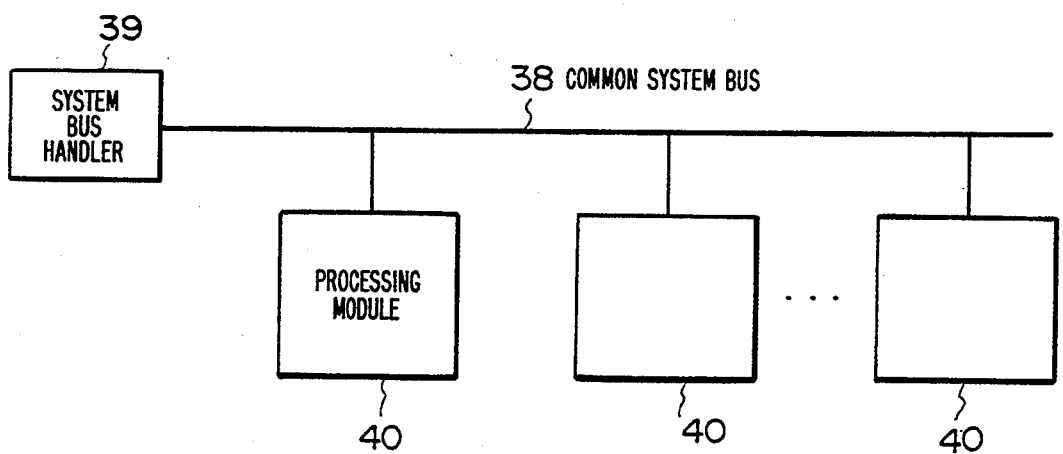
FIG. 2 is a block diagram of a system structure of a multiprocessor system to which the present invention is applied.

Next, a further detailed description will be given of an embodiment of the present invention. FIG. 2 shows a system structural diagram of a multiprocessor system to which the present invention is applied. In the multiprocessor system, a plurality of processing modules 40 (corresponding to the above processing modules 10) are mutually connected via a common system bus 38 the arbitration of which is centrally managed by a system bus handler 39. In this figure, the common system bus 38 is shown as a single bus, but a plurality of common system buses 38 may be provided to connect each of the processing modules 40 via the independent common system buses 38.

Figure 3:
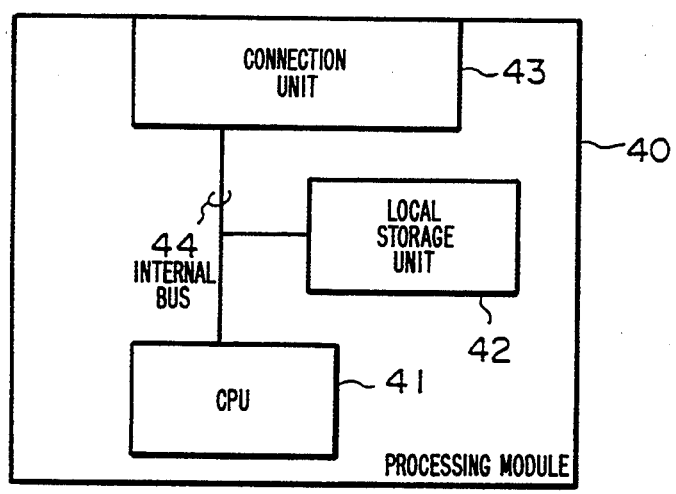
FIG. 3 is a block diagram of a processing module.

FIG. 3 shows a detailed structural diagram of the processing module 40. The processing module 40 includes a central processing unit 41, a local storage unit (LSU) 42 of a main memory which is locally provided to form the loosely coupled relationship, a connection unit 43 which is provided to process the connection to the common system bus 38, and an internal bus 44 for connecting these units. The central processing unit 41 corresponds to the above central processing unit 11, the logical storage unit 42 corresponds to the above memory unit 12, and the connection unit 43 corresponds to the above connection unit 13.

In the processing module 40, the softwares which operate on the central processing unit 41 and the local storage unit 42 run, and a series of operations is carried out when the softwares mutually cooperate while becoming the communication request source. The central processing unit 41 provided in the processing module 40 fetches the instruction code only from the ROM (not shown) and the local storage unit 42 within its own processing module. In addition, the connection unit 43 is assigned a specific unit number.

Figure 4:
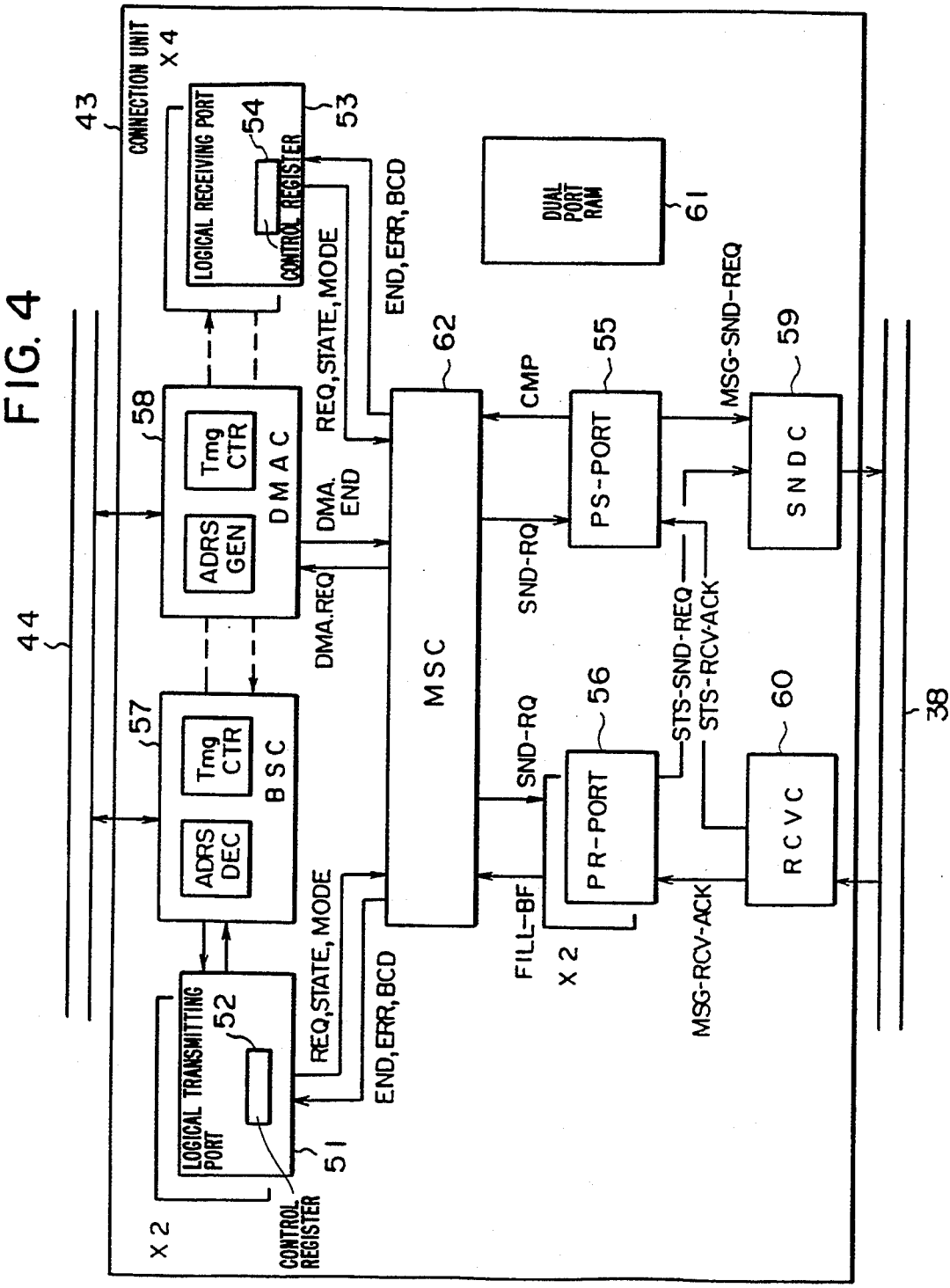
FIG. 4 is a block diagram of an embodiment of a connection unit according to the present invention.

FIG. 4 shows an embodiment of the connection unit 43 which is provided to realize the message communication process of the present invention. In FIG. 4, the connection unit 43 includes a logical transmitting port (S-OPRT) 51 which is a transmitting port which can see the software running on the central processing unit 41, a logical receiving port (R-PORT) 53 which is a receiving port which can see the software, a physical transmitting port (PS-PORT) 55 which controls the message transmission to other processing modules 40, a physical receiving port (PR-PORT) 56 which controls the message reception from other processing modules 40, an access control unit (BSC) 57 which processes the interface between the internal bus 44, a memory access control unit (DMAC) 58 which makes access to the local storage unit 42 shown in FIG. 3, a transmission control unit (SNDC) 59 which processes the transmission process interface between the common system bus 38 and the physical transmitting port, a reception control unit (RCVC) 60 which processes the reception process interface between the common system bus 38 and the physical receiving port, a dual port random access memory (RAM) 61 which enables dual access, and a main sequence control unit (MSC) 62 which manages the control of the entire unit. The logical transmitting port 51 has a control register 52, and the logical receiving port 53 has a control register 54. These control registers 52 and 54 may be provided in the dual port RAM 61.

The logical transmitting port (S-PORT) 52 corresponds to the above logical transmitting port 21, and for example, two such ports are provided as in this embodiment, and two or more such ports are preferably provided. The logical receiving port (R-PORT) 54 corresponds to the above logical receiving port 22, and for example, four such ports are provided as in this embodiment, and four or more such ports are preferably provided. Accordingly, the software which runs on the central processing unit 41 enables simultaneous transmission of a plurality of messages and enables simultaneous reception of a plurality of messages.

On the other hand, the physical transmitting port (PS-PORT) 55 corresponds to the above physical transmitting port 27, and one such port is provided due to its character. The physical receiving port (PR-PORT) 56 corresponds to the above physical receiving port 25, and for example, two such ports are provided in this embodiment, and a number of such ports smaller than the number of the logical receiving ports 54 and being one or more is preferably provided. In addition, as will be described later, by employing a control system in which the plurality of logical transmitting ports 51 use the physical transmitting port 55 in common and the plurality of logical receiving ports 54 use the physical receiving port 56 in common, it is possible to reduce the amount of the hardware of the connection unit 43. In a case where a function is provided on the side of the common system bus 38 from the physical transmitting port 55 to serialize the process of the physical transmitting port 55, it is possible to provide not one but a plurality of physical transmitting ports 55.

A 256-byte holding buffer corresponding to the physical transfer block on the common system bus 38 is provided in the dual port RAM 61 for each of the logical transmitting port 51 and the logical receiving port 53. The number of holding buffers belonging to the logical transmitting port 51 corresponds to the number of physical transmitting ports 55, and the number of holding buffers belonging to the logical receiving port 53 corresponds to the number of physical receiving ports 56.

The physical transmitting port 55 is logically connected to the logical transmitting port 51 according to the control process of the main sequence control unit (MSC) 62, and the transfer request MSG-SND-REQ of the message block within the holding buffer belonging thereto is issued to the transmission control unit (SNDC) 59. The answer STS-RCV-ACK with respect to the transmission of this message block is received by the reception control unit 60, and the physical transmitting port 55 executes the process of notifying the logical transmitting port 51.

Figure 5A:
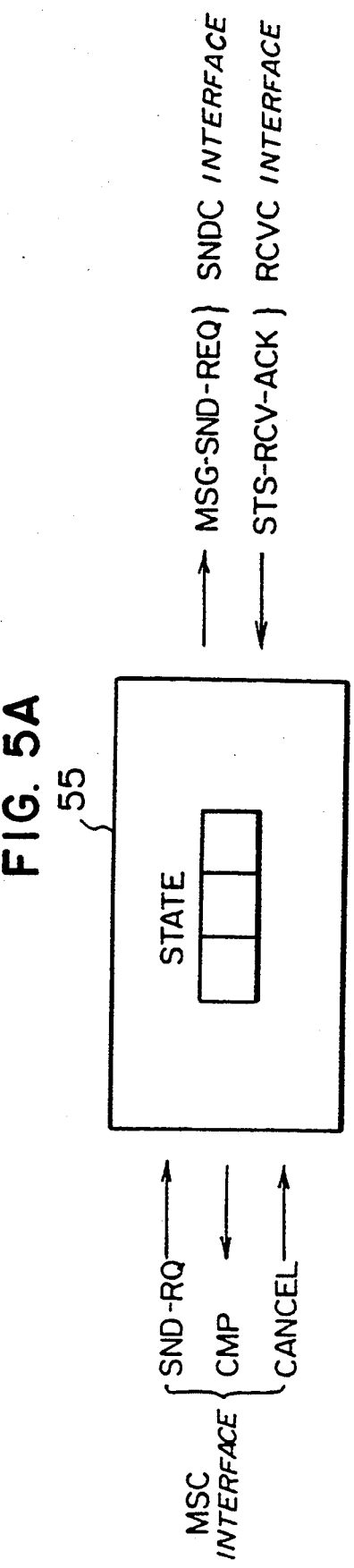
FIGS. 5A and 5B show operation state transition diagram of input and output signals in an embodiment of a physical transmitting port according to the present invention.
Figure 5B:
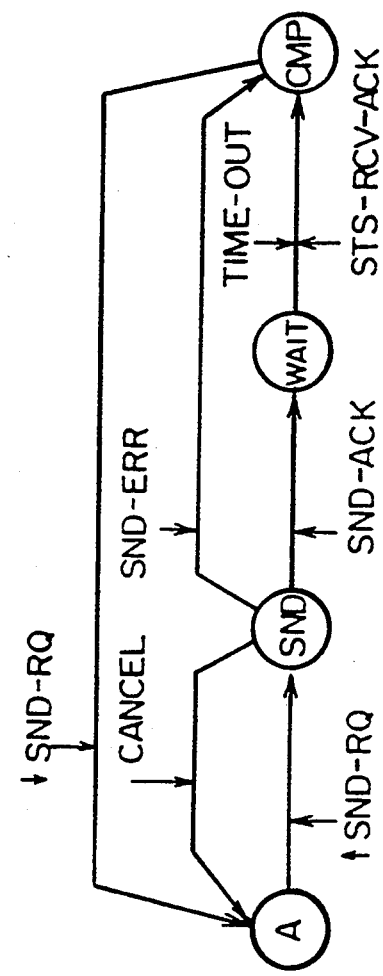

The input and output signals of this physical transmitting port (PS(PORT) 55 are shown in FIG. 5(a), and an embodiment of the state transition of this process is shown in FIG. 5(b). As shown in FIG. 5(a), the cancel request (CANCEL) and the message transmission request SND-RQ from the main sequence control unit (MSC) 62 are input to the physical transmitting port 30 (PS-PORT) 55, and the physical transmitting port 55 makes a process resume request CMP with respect to the MSC 62.

As shown in FIG. 5(b), the PS-PORT 55 undergoes a transition to the SND state if the message transmission request SND-RQ is input in an A state in which the message transmission request SND-RQ from the MSC 62 is awaited. In this SND state, the message block is transmitted to the system bus 38 via the SNDC 59.

In this SND state, a transition takes place to the WAIT state by the normal signal SND-ACK from the SNDC 59 or to the CMP state by the abnormal signal SND-ERR. In addition, a transition takes place to the A state after withdrawing the request to the SNDC 59 when there is the CANCEL request from the MSC 62.

The above WAIT state is the state in which the status reception from the receiving side processing module is awaited. When the status reception complete signal STS-RCV-ACK is input from the reception control unit (RCVC) 60 in this WAIT state or, when the status reception time is out, a state transition takes place to the CMP state. In this CMP state, the transmission complete is transmitted to the MSC 62, and the resumption of the process is requested. A state transition takes place to the A state when the recognition signal (=transmission request) to the MSC 62 from the PS-PORT 55 in the CMP state is withdrawn.

On the other hand, when the physical receiving port (PR-PORT) 56 receives the reception start notification by the storage of the transmitting message block into the holding buffer belonging thereto according to the process of the reception control unit (RCVC) 60, the physical receiving port 56 is logically connected to the logical receiving port 53 which is to receives data according to the control process of the main sequence control unit (MSC) 62. After completion of the operation of the logical receiving port 53, the physical receiving port 56 executes the process of issuing the answer transmission request STS-SND-REQ of the reception completion to the transmission control unit (SNDC) 59.

Figure 6A:
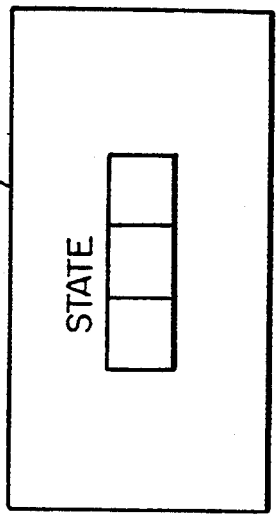
FIGS. 6A and 6B show an operation state transition diagram of input and output signals in an embodiment of a physical receiving port according to the present invention.
Figure 6B:
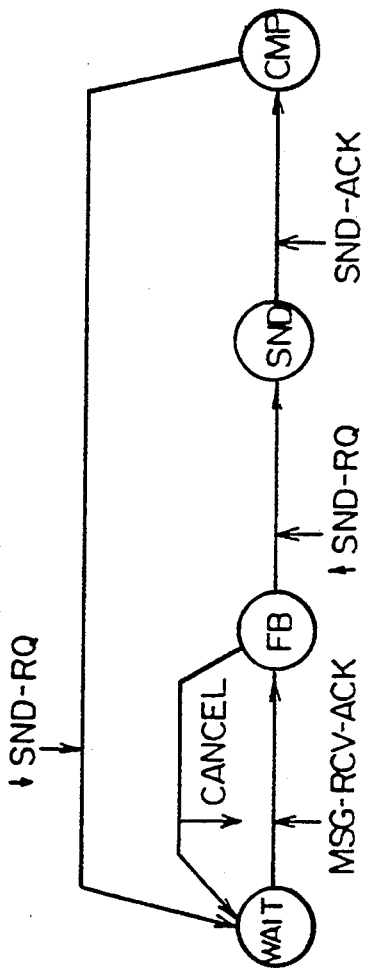

The input and output signals of this physical receiving port (PR-PORT) 56 are shown in FIG. 6(a), and an embodiment of the state transition of the process is shown in FIG. 6(b). As shown in FIG. 6(a), the message reception start signal MSG-RCV-ACK from the reception control unit (RCVC) 60 is input to the physical receiving port (PR-PORT) 56 other than the above answer transmission request STS-SND-REQ. In addition, the status transmission request SND-RQ from the main sequence control unit (MSC) 62 is input to the physical receiving port 56, and the physical receiving port 56 outputs the cancel request CANCEL and the FB state signal FILL.BF with respect to the MSC 62.

As shown in FIG. 6(b), when the message reception start signal MSG-RCV-ACK from the RCVC 60 is input to the PR-PORT 56 in the WAIT state in which the message reception is awaited, a state transition takes place to the FB state. This FB state transmits the reception start to the MSC 62 by the above FILL.BF, and is a state which requests the start of the process. After notifying the reception complete signal of the RCVC 60, the PR-PORT 56 makes a transition to the SND state by the status transmission request SND-RQ of the MSC 62. Further, when there is the CANCEL request from the RCVC 60, a state transition takes place to the WAIT state after withdrawing the request to the MSC 62.

The above SND state is a state in which the status block is transmitted to the system bus 38 via the SNDC 59. In this SND state, the PR-PORT 56 makes a state transition to the CMP state by the transmission complete signal SND-ACK from the SNDC 59. This CMP state transmits the transmission completion to the MSC 62, and is a state in which the resumption of the process is requested. When the recognition signal (=transmission request) from the MSC 62 is withdrawn in this CMP state, the PR-PORT 56 makes a state transition to the above WAIT state.

Returning again to the description of FIG. 4, the access control unit (BSC) 57 carries out a control when the connection unit 43 becomes the bus slave of the internal bus 44, and is provided with functions such as the function of decoding the address information of the specified register and the function of carrying out a control to match the timing with the internal bus 44. The access control unit 57 notifies the data information from the side of the internal bus 44 to the logical transmitting port 51 or the logical receiving port 53, and notifies the data information from the side of the logical transmitting port 51 or the logical receiving port 53 to the internal bus 44.

When the connection unit 43 becomes the bus master of the internal bus 44, the memory access control unit (DMAC) 58 makes direct access to the local storage unit 42 (FIG. 3) according to the indication from the main sequence control unit (MSC) 62 and executes the data transfer between the local storage unit 42 and the dual port RAM 61.

Figure 7:
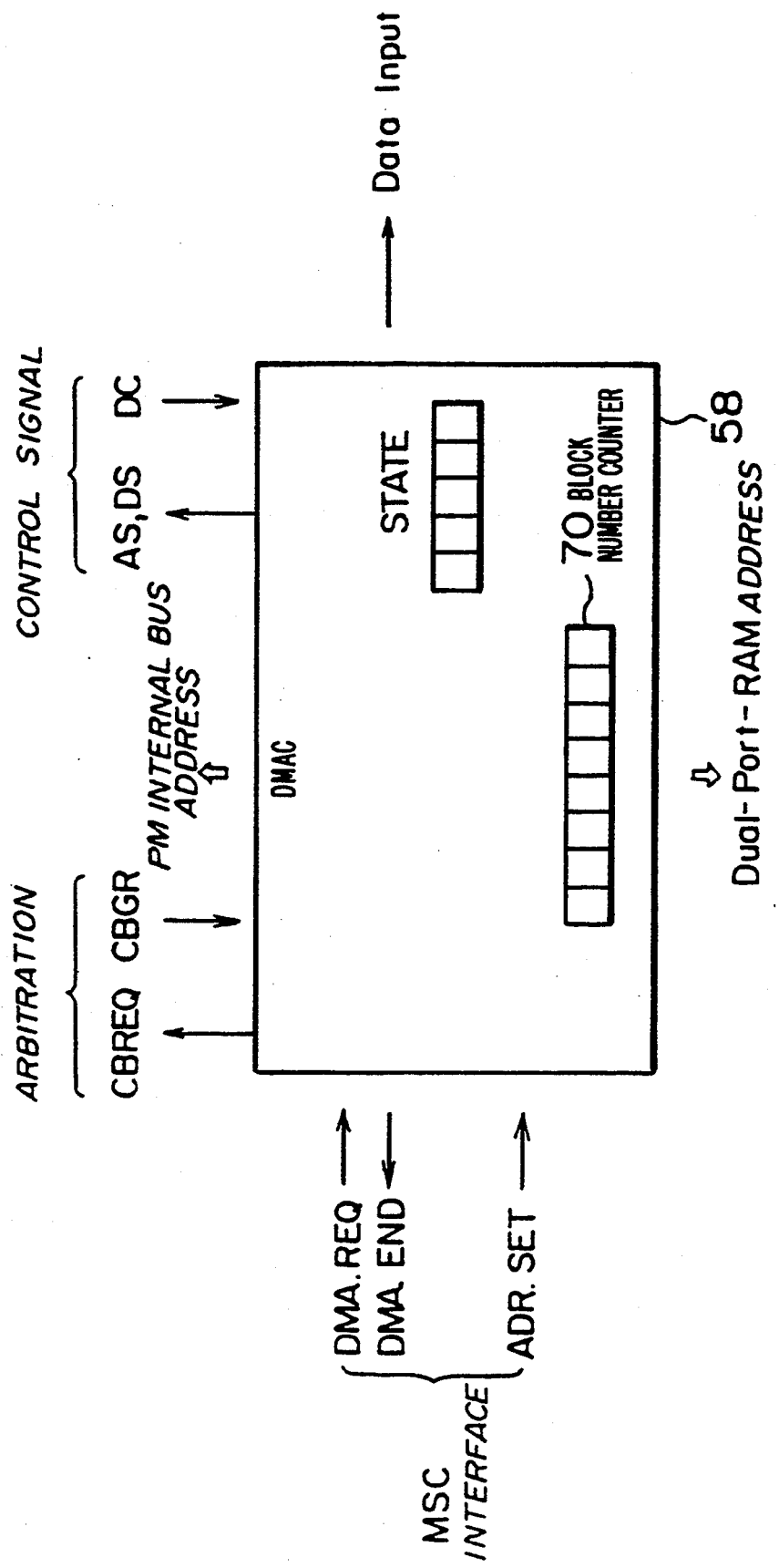
FIG. 7 is a diagram of input and output signals of a memory access control unit according to the present invention.

FIG. 7 shows an embodiment of the input and output signals of this DMAC 58 which includes a block number counter 70 and the like. The DMAC 58 is provided with functions such as the function of generating the address information for making the access and the function of carrying out a control to match the timing of the internal bus 44.

The transmission control unit 59 makes the transmission start request to the common system bus 38 and the control of each transmission (transmission of message block/transmission of answer) according to the requests of the physical transmitting port 55 and the physical receiving port 56. The reception control unit 60 monitors the common system bus 38, and stores the data in the corresponding address of the dual port RAM 61 if the message block or answer is intended for its own unit number. Then, the reception control unit 60 carries out the process of notifying the logical transmitting port 51 or the logical receiving port 53 via the physical transmitting port 55 or the physical receiving port 56.

The work regions for the logical transmitting port 51 and the logical receiving port 53 are provided in the dual port RAM 61 in addition to the above described holding buffer. The access to this dual port RAM 61 is made by the main sequence control unit (MSC) 62 from the bus control part which is on the side of the PM internal bus 44 and is formed by the logical transmitting port 51, the logical receiving port 53, the access control unit 57 and the memory access control unit 58. The access to this dual port RAM 61 is also made from the bus control part which is on the side of the common system bus 38 and is formed by the physical transmitting port 55, the physical receiving port 56, the transmission control unit 59 and the reception control unit 60. The main sequence control unit (MSC) 62, the dual port RAM 61 and the like realize each of the above means 23 to 35.

Figure 8:
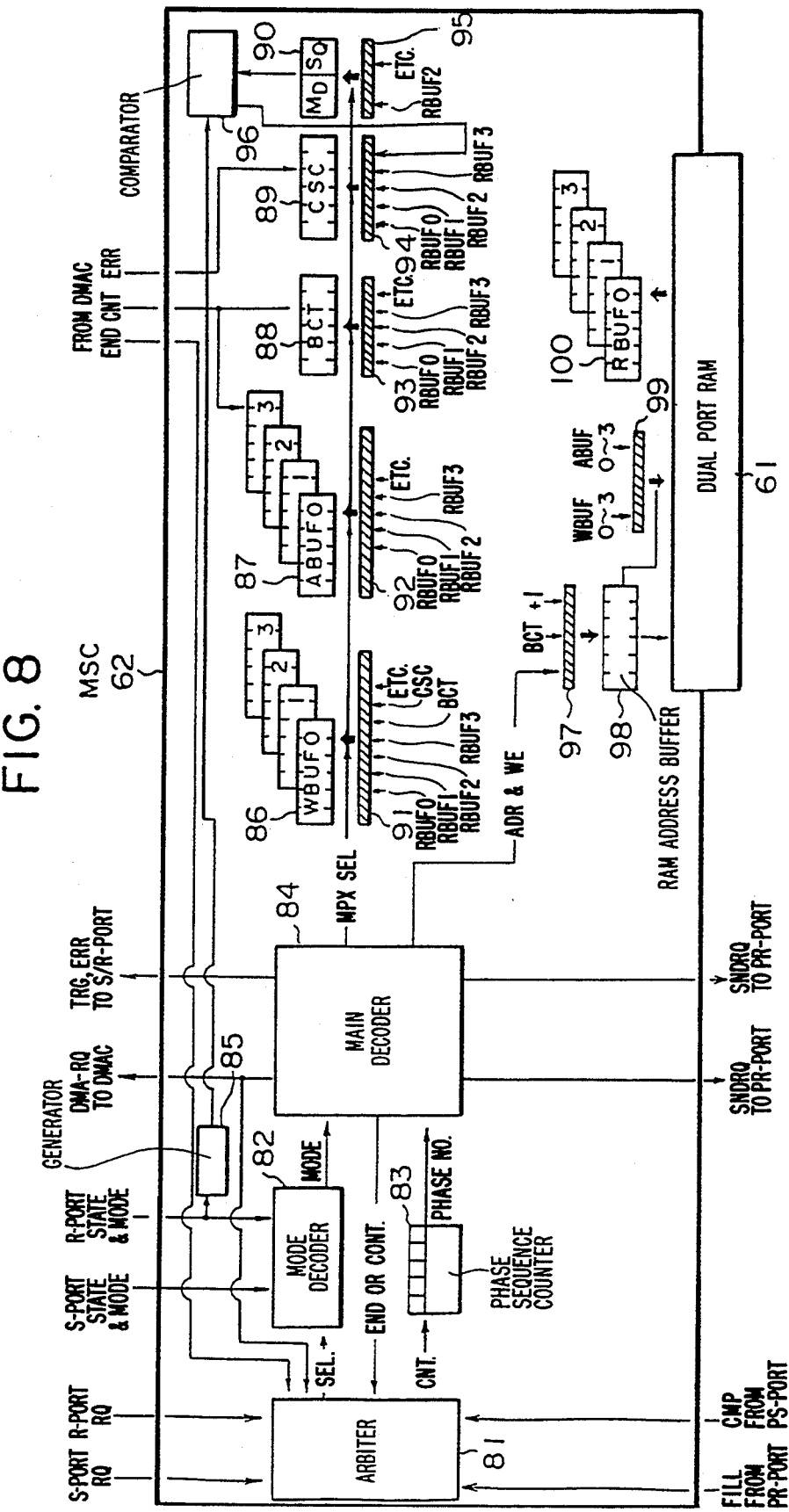
FIG. 8 is a block diagram of an embodiment of a main sequence control unit according to the present invention.

FIG. 8 shows a block diagram of an embodiment of the above main sequence control unit (MSC) 62. As shown in this figure, the MSC 62 includes an arbiter 81, a mode decoder 82, a phase sequence counter 83, a main decoder 84, a generator 85, a work buffer (WBUF) 86, an address buffer (ABUF) 87, a byte counter buffer (BCT) 88, an end code buffer (CSC) 89, a buffer 90, selectors 91 to 95, 97 and 99, a comparator 96, a RAM address buffer 98, a RAM buffer 100 and the like.

The selectors 91 to 95 and 97 are respectively provided in correspondence with the input sides of the buffers 86 to 90 and 98, and switch and output the data from the RAM buffer 100 based on a select signal from the main decoder 84. The selector 91 also selectively output the data from the BCT 88 and the CSC 89. In addition, the selector 94 selects and outputs the outputs signal of the comparator 96 to the CSC 89. Furthermore, the selector 99 selects and supplies each output data of the WBUF 86 and the ABUF 87 to the dual port RAM 61. This dual port RAM 61 is used as the work area of the MSC 62 as described above.

In this MSC 62, the arbiter 81 receives the process request RQ from the S-PORT 51 or the R-PORT 53 or the state notification from the PS-PORT 55 or the PR-PORT 56, and selects the same according to an appropriate priority sequence. The phase sequence counter 83 starts to operate from the time when this selection is made. In addition, the operation mode is determined depending on the selected port and the state of this port.

Next, the MSC 62 successively selects and processes the information from the dual port RAM 61 according to the phase which is determined by the determined operation mode and the output value of the phase sequence counter 83. The information is extracted to each buffer group of the WBUF 86, the ABUF 87, the BCT 88 and the CSC 89, and is again written into the dual port RAM 61. Moreover, the DMAC 58 shown in FIG. 4 is activated if necessary during this procedure.

The MSC 62 activates the S-PORT 51, the R-PORT 53, the PS-PORT 55 or the PR-PORT 56 during or at the end of the above phase depending on the operation mode. At the end of the above phase, the MSC 62 transmits an end signal from the main decoder 84 to the arbiter 81 to release the arbiter 81. In addition, the MSC 62 supplies a trigger signal or an error signal to the S-PORT 51 and the R-PORT 53 so as to make a state transition of each port. Depending on the situation, the main decoder 84 outputs a control signal to the arbiter 81 and continues the next process with the same port.

Next, a description will be given of an activation interface between hardware/software.

Figure 9:
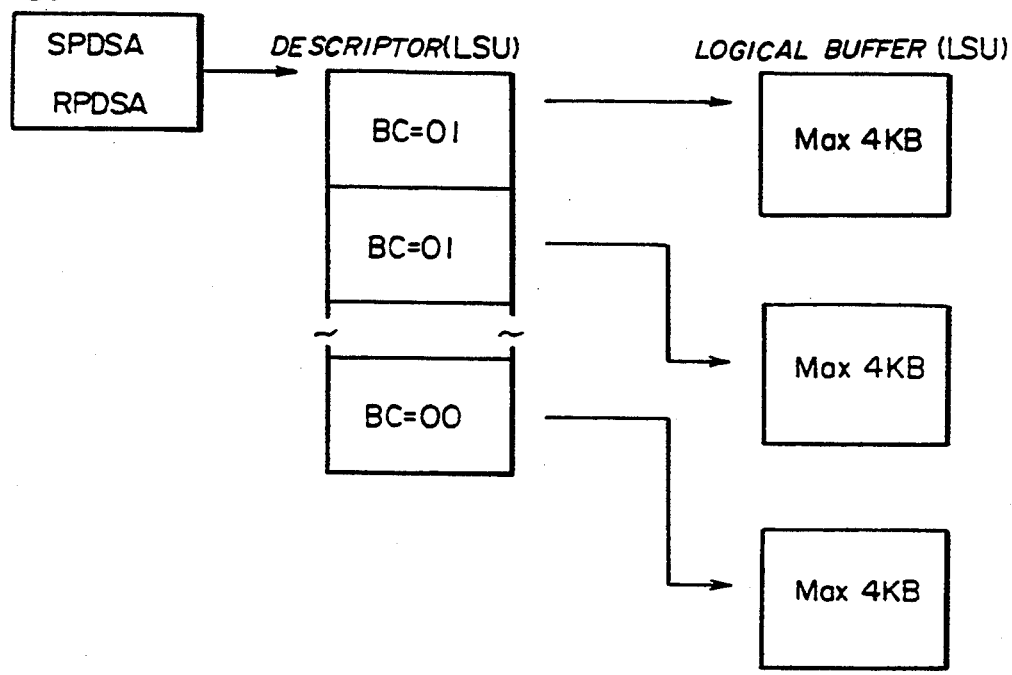
FIG. 9 is a block diagram of an embodiment of a descriptor according to the present.

The software which runs on the central processing unit 41 shown in FIG. 3 arranges the descriptor which indicates the detailed control contents in the logical storage unit 42 when activating the S-PORT 51 or the R-PORT 53. FIG. 9 shows an embodiment of the structure of this descriptor.

The descriptor arranged in the local storage unit (LSU) 42 takes the same structure for the S-PORT 51 and the R-PORT 53, and is arranged in a sequential format as shown in FIG. 9 taking 16 bytes as one entry or in a branch format.

The head entry of this descriptor is pointed by the address information which is set in the regions "SPDSA" and "RPDSA" within the control registers (52 and 54 shown in FIG. 4) in the S-PORT 51/R-PORT 53. Each entry is written with the address information, size information and the like of the logical buffer (for example, each having a capacity of 4 kbytes) in the local storage unit (LSU) 42.

Figure 10:
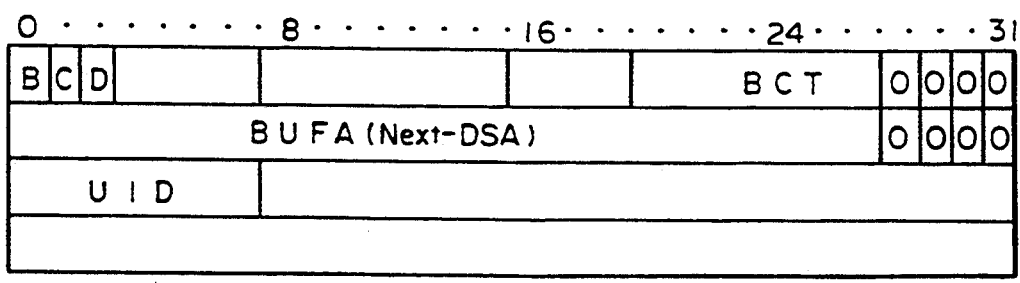
FIG. 10 is a diagram of an embodiment of a managing data of an entry of a descriptor according to the present invention.

FIG. 10 shows an embodiment of the entry managing data of this descriptor. The combination of the B bit and C bit in this figure indicates continuation to the next entry which is sequentially arranged after the processing of the instant entry ends if "BC=01", indicates the branching to the entry which is indicated by the instant entry if "BC=11", indicates the end of the process after the processing of the instant entry ends if "BC=100", and indicates the end of the process without executing the process of the instant entry if "BC=10". In addition, the D bit in FIG. 10 indicates the existence or non-existence of an interrupt to the software at the time when the processing of the instant entry is completed.

In FIG. 10, the 1-byte information field indicated by "BCT", the information field indicated by "BUFA" and the information field indicated by "UID" have contents which differ for the S-PORT 51 and the R-PORT 53.

In the entry managing data of the descriptor for the S-PORT 51, the byte size (units of 16 bytes, maximum of 4 kbytes) of the logical buffer in the local storage unit 42 treated by the instant entry is stored in the PCT information field, the head address (16-byte boundary address) of said logical buffer is stored in the BUFA information field, and the unit number of the connection unit (MBC) 43 of the transmitting processing module is stored in the UID information field.

On the other hand, in the entry managing data of the descriptor for the R-PORT 53, the size information of the logical buffer depending on the communication mode is stored in the BCT information field, the head address of the logical buffer in the local storage unit 42 treated by the instant entry is stored in the BUFA information field, and the unit number of the connection unit 43 of the transmitting processing module received is stored in the UID information field.

In the above communication mode, there is the ANY mode and the SPECIFIC mode. The ANY mode is the mode in which an arbitrary message transmitted therefor is received, and there is a level 0 which is used for the normal communication process and a level 1 which is used for the emergency communication process. The SPECIFIC mode is the mode in which an agreement is made in advance between the transmitting side and the receiving side, and the large amount of messages which are the subject of the transmission is directly communicated to the specified address region and not the general buffer. In the above entry managing data for the R-PORT 53, the size information of the received message is stored in the BCT information field in the ANY mode and predetermined size information is stored in the BCT information field in the SPECIFIC mode.

If the BC bits specify the branching of the entry, the branching address information of the entry is stored in the BUFA information field, but nothing is specified in the BCT information field and the UID information field.

The software which runs on the central processing unit 41 writes the control indication in the control register 52 of the S-PORT 51 if the descriptor is arranged in the local storage unit 42 and the S-PORT 51 is next activated. In addition, when activating the R-PORT 53, the software writes the control indication in the control register 54 of the R-PORT 53.

FIG. 11 shows an embodiment of the control indication data set in the control register 52 of the S-PORT 51, and FIG. 12 shows an embodiment of the control indication data set in the control register 54 of the R-PORT 53. In FIG. 11, "SPDSA", "SPODF" and "SPFCP" are the regions in which the software running on the central processing unit 41 writes. The software writes the address information DSA of the first descriptor which starts the control in this "SPDSA", the indication of communication mode in which the communication process is to be carried out among the level 0 of the ANY mode, the level 1 of the ANY mode and the SPECIFIC mode in "SPODF", and the indication of the forced end during operation in "SPFCP".

In addition, in FIG. 11, "SPOPS" and "SPCST" are the regions in which the software writes on the side of the connection unit 43 and then reads. The connection unit 43 writes the entry address information CDSA of the descriptor which is being processed in the "SPOPS", and writes the end state information CSC in the "SPCST". When the write access to the described "SPODF" is executed, the S-PORT 51 is activated.

On the other hand, in FIG. 12, "RPDSA", "RPODF", "RPFCP" and "RPSSI" are the regions in which the software running on the central processing unit 41 writes. The software writes the address information of the first descriptor which starts the control in the region "RPDSA", writes the indication of the operation mode in "RPODF", writes the indication of the forced end during operation in "RPFCP", and writes the unit number of the transmitting connection unit 43 which is specified in the case of the SPECIFIC mode before the start.

In addition, in FIG. 12, "RPOSP" and "RPCST" are the regions in which the software writes on the side of the connection unit 43 and then reads. The connection unit 43 writes the entry address information CDSA of the descriptor within the processing signal in "RPOPS", and writes the end state information CSC in "RPSCT". When the write access to the described "RPODF" is executed, the R-PORT 53 is activated. The unit number written in "RPSSI" is used to decide whether or not the message is from the connection unit 43 specified as the transmitting source when making the reception process in the SPECIFIC mode.

The software which runs on the central processing unit 41 must specify and start the communication mode to the level 0 of the ANY mode for at least one of the two R-PORTs 53 which are provided in order to execute the normal communication process. This software must specify and start the communication mode to the level 1 of the ANY mode for at least one of the two R-PORTs 53 in order to execute the emergency communication process. By making this preparation, it is possible to communicate the emergency message without confusing it with the normal message.

The software of each processing module activates the S-PORT 51 at any time when the transmission process in the ANY mode becomes necessary. In this case, the unit number of the connection unit 43 of the transmitting destination set in the UID information field of the entry of the descriptor for the S-PORT 51 can be set independently for each entry. If a plurality of S-PORTs 51 are provided, the unit number can also be set independently for each S-PORT 51. Hence, the software can carry out the transmission process with respect to a plurality of processing modules 40 at the same time.

In addition, when carrying out the communication process in the SPECIFIC mode (hereinafter referred to as the SPC mode), the software of the transmitting side processing module 40 must notify the receiving side processing module 40 in advance using the ANY mode to advise that the communication will be carried out in the SPC mode and the byte length of this communication. The software of the receiving side processing module 40 makes preparations for the reception when the above notification is received, including the arranging of the descriptor and the activation of the R-PORT 53, and thereafter returns an answer message to the transmitting side processing module 40. When the software of the transmitting side processing module 40 confirms this answer message, the S-PORT 51 is activated in the SPC mode and the communication process in the SPC mode is executed.

Next, a detailed description will be given of the data transfer system between the processing modules 40.

In this embodiment, it is assumed that the byte size of the logical buffer which can be specified by one entry of the descriptor is 4 kbytes (units of 16 bytes) at the maximum, and thus, the maximum length of the message which can be specified by one entry of the descriptor is 4 kbytes. On the other hand, the unit of the message which can be transferred at one time on the common system bus 38 is 256 bytes, for example, and is relatively small.

The connection unit 43 of this embodiment carries out the transfer by dividing the message into parts of 256 bytes which is the transfer unit of the common system bus 38, and the remaining bytes are transferred in the last block. The transmitting side connection unit 43 adds identifiers F(First)/M(Middle)/L(Last)/S(Single) to each transfer unit on the common system bus 38 in order to identify the first block, the middle block and the last block of the series of messages. On the other hand, the receiving side connection unit 43 carries out the process of reassembling the message which is transmitted according to this identifier.

Other than the identifier, the transmitting side connection unit 43 adds the communication mode, the unit number of itself which is the transmitting source, the unit number of the connection unit 43 at the transmitting destination, the byte length to be transmitted and the port number (may be omitted) of the S-PORT 51 at the transmitting source to the command and transmits the transmitting message.

In the ANY mode, the message in the logical buffer specified by each entry of the descriptor is treated as the message forming one transfer unit, and is transferred to the processing module 40 at the communication destination. In the case of this ANY mode, if the length of the message to be transferred exceeds 256×2 bytes, the connection unit 43 transfers the message amounting to the first 256 bytes by adding the identifier F as shown in FIG. 13($a$), thereafter successively transfers in 256 bytes by adding the identifier M, and finally transfers the remaining bytes by adding the identifier L.

Figure 13A:
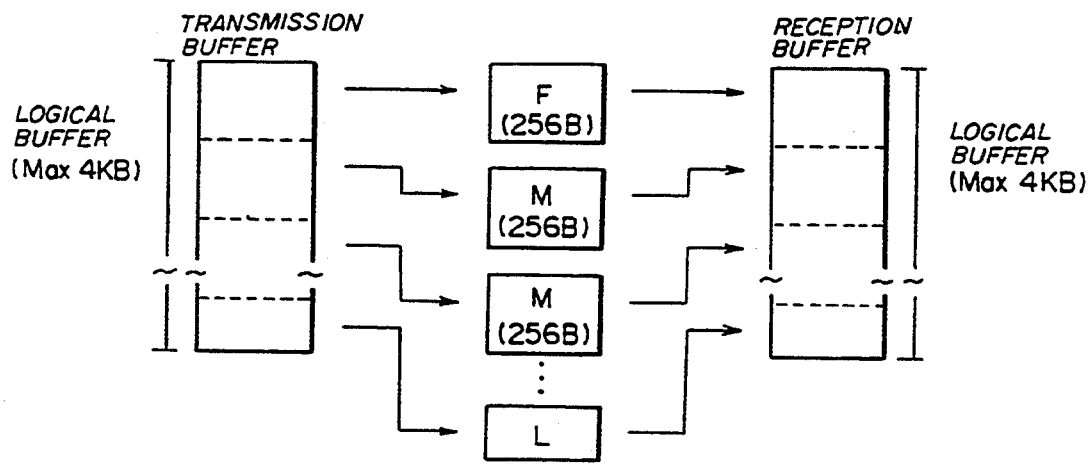
FIGS. 13A–C are explanatory diagrams of a message block transfer during an ANY mode.
Figure 13B:
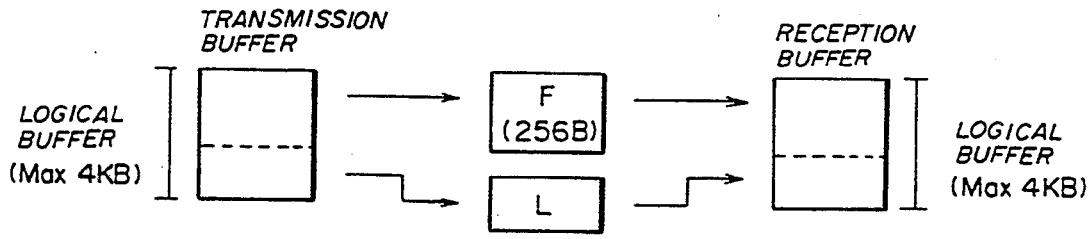
Figure 13C:
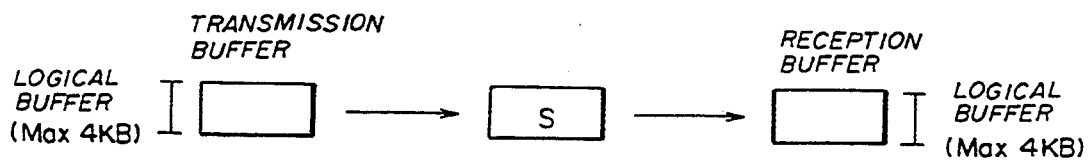

If the length of the message to be transferred falls between 256 bytes and 256×2 bytes, the connection unit 43 transfers the message amounting to the first 256 bytes by adding the identifier F as shown in FIG. 13($b$), and then transfers the remaining bytes by adding the identifier L. In addition, if the length of the message to be transferred is less than or equal to 256 bytes, the message amounting to this number of bytes is transferred by adding the identifier S as shown in FIG. 13($c$).

Hence, in the ANY mode, the transfer process ends with the transfer of the series of F to L blocks or the transfer of the single S block at both the transmitting and receiving sides. Moreover, the F and M blocks are constantly transferred in 256 bytes, and the S and L blocks are transferred in 256 bytes or less.

On the other hand, in the SPC mode, the entire message in the logical buffer which is specified by the entry connected to the descriptor chain is treated as the message forming one transfer unit, and is transferred to the logical buffer which is connected by the chain of the processing module 40 at the transmitting destination.

The SCP mode employs such a transfer system to enable transmission in the fine division, so that it is possible to reduce the overhead required for the retransfer of data within the local storage unit 42 at the transmitting and receiving sides necessary because the logical buffer is a general buffer as in the case of the ANY mode, and furthermore, so that the message having a large quantity can be transmitted without being affected by the size of the logical buffer which is generally provided.

Figure 14:
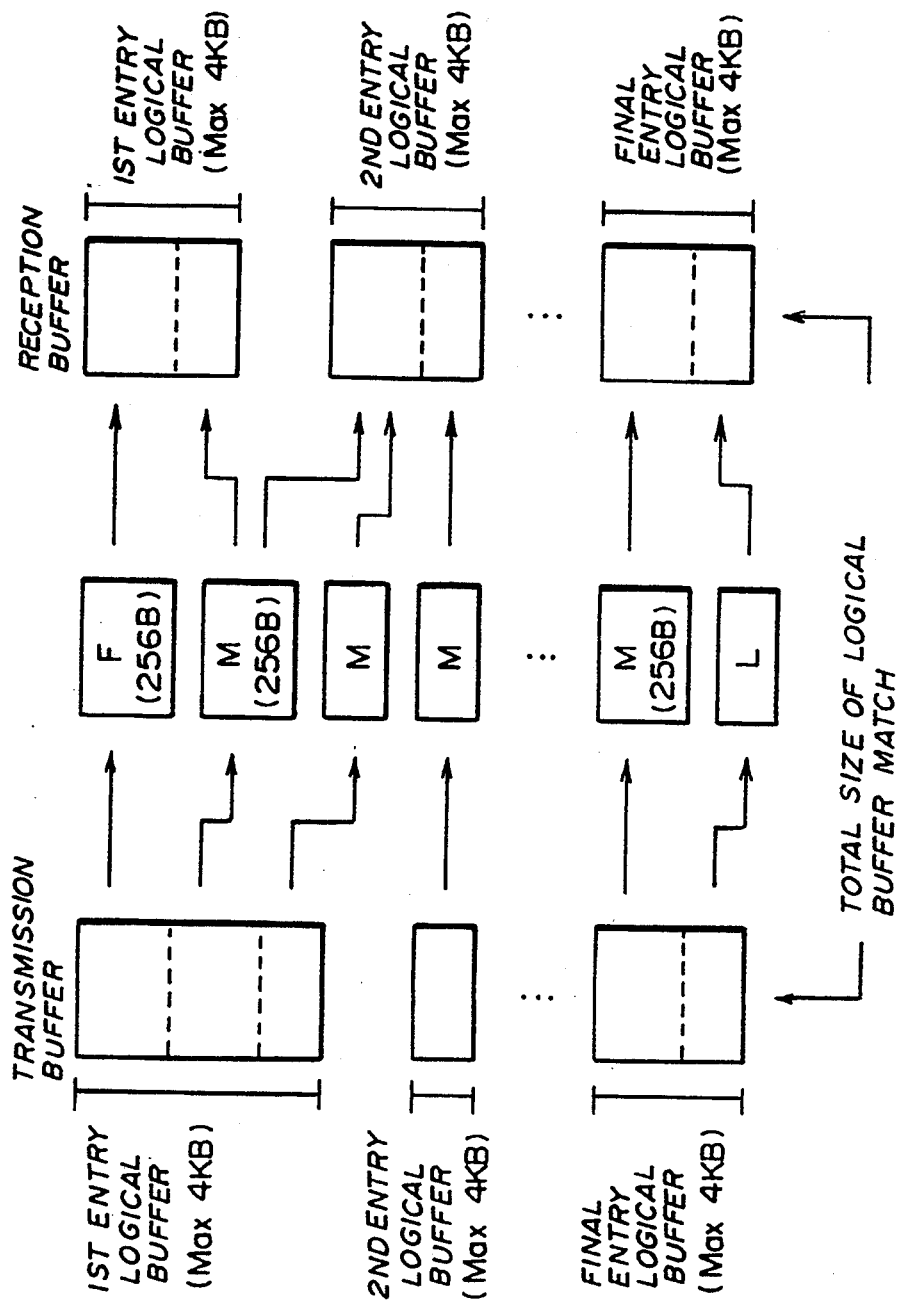
FIG. 14 is an explanatory diagram of a message block transfer during a SPECIFIC mode.

In the case of this SPC mode, the first block of the first entry is the F block, the last block of the last entry is the L block, and the other middle entries are the M blocks as shown in FIG. 14. The connection unit 43 of the transmitting side transfers as one transfer block the unit of 256 bytes or the entry to the buffer boundary. In addition, the connection unit 43 of the receiving side carries out the store process of the next entry into the logical buffer if the buffer boundary of the entry is detected during the transferring block.

In the SPC mode, the F and M blocks are not necessarily limited to 256 bytes, and the renewal of the entry at the transmitting and receiving sides are not always synchronized. However, the total size of the logical buffer for all entries on the transmitting side of course matches the total size of the logical buffer for all entries on the receiving side. In the present invention, means is provided to confirm this match so as to detect the redundant or missing message in the SCP mode.

In the present invention, the logical connection between the transmitting side S-PORT 51 and the receiving side R-PORT 53 during communication of the series of messages starts by the transmission and reception of the F block and ends with the transmission and reception of the L block. The connection information related to this logical connection is held in the transmitting side S-PORT 51 and the receiving side R-PORT 53.

Generally, the plurality of S-PORTs 51 of each connection unit 43 simultaneously have the logical connection relationship to the R-PORTs 53 of other connection units 43.

The MSC 62 of each connection unit 43 switches the physical transmitting port (PS-PORT) 55 of its connection unit 43. This switching process is executed in units of one entry of the descriptor. The processes of the plurality of PS-PORTs 55 of each connection unit 43 are alternately executed in entry units and serialized by the switching process of this MSC 62.

In the ANY mode, the logical connection relationship between the transmitting side S-PORT 51 and the receiving side R-PORT 53 ends for every entry unit. On the other hand, in the SPC mode, since one message is formed by a plurality of entries, the switching of the PS-PORT 55 is carried out in a state where the logical connection between the transmitting side S-PORT 51 and the receiving side R-PORT 53 is maintained during the message unit.

Figure 15:
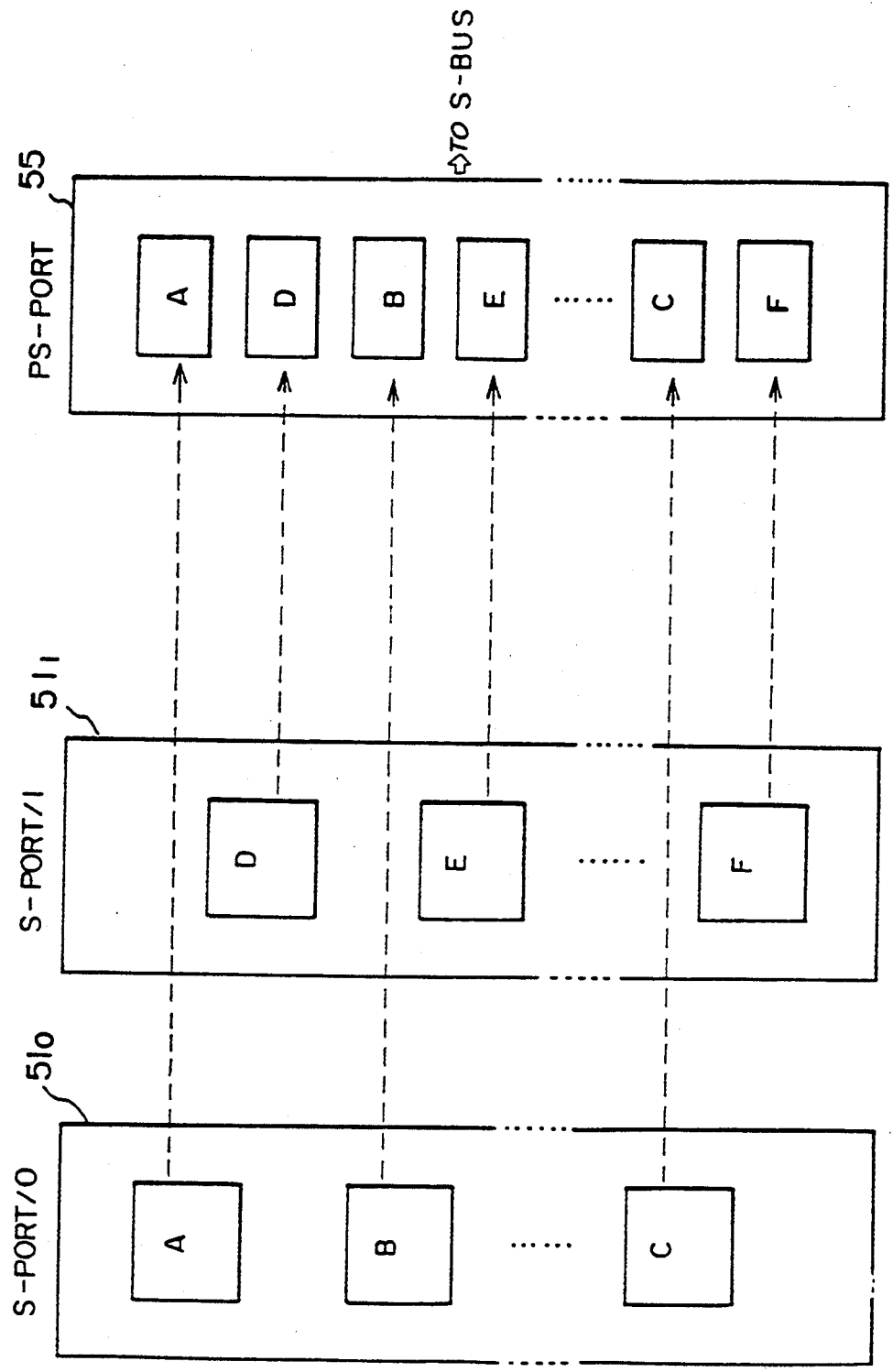
FIG. 15 is a block diagram of a physical transmitting port switching process.

FIG. 15 shows an example of the switching process of the PS-PORT 55. That is, the PS-PORT 55 first transmits the message of the entry A of the logical transmitting port (S-PORT) $51_0$ having the number 0, then transmits the message of the entry D of the logical transmitting port (S-PORT) $51_1$ having the number 1, transmits the message of the entry B of the S-PORT $51_0$, next transmits the message of the entry E of the S-PORT $51_1$, and similarly carries out the process of alternately switching the output message of the S-PORTs $51_0$ and $51_1$.

Accordingly, when the two S-PORTs $51_0$ and $51_1$ are activated, a process is carried out so as to execute the transmission process of the two S-PORTs $51_0$ and $51_1$ to which the activation request is made. The PS-PORT 55 is disconnected from the R-PORT 53 at the communication destination for every transfer block depending on the protocol of the common system bus 38. By the control process of the MSC 62, a process is carried out so as not to connect the S-PORT $51_0$ or $51_1$ to the PS-PORT 55 until the transmission of all the message of one entry is completed.

The PR-PORT 56 of each connection unit 43 notifies the start of the reception to the MSC 62 when the message block is received. When this notification is received, the MSC 62 first identifies the connection unit 43 which is the transmitting source. Further, if the communication mode is the ANY mode and no R-PORT 53 has the logical connection relationship to the identified connection unit 43, the MSC 62 carries out a control so as to receive the message block by the R-PORT which matches the level of the transmitted message block.

The message block which is received in this case must be the F block or the S block, and this logical connection continues as a normal connection if the received message block is the F block or the S block. On the other hand, if the received message block is the M block or the L block, some kind of protocol error exists, and the MSC 62 notifies the connection unit 43 at the transmitting source via the PR-PORT 56 and the transmission control unit (SNDC) 59, and does not connect to any of the R-PORTs 53 which can receive the data. In addition, if there does not exist any R-PORT 53 which can receive the data the connection unit 43 is notified at the transmitting source.

On the other hand, if the communication mode is the ANY mode and the logical connection relationship exists between one of the R-PORTs 53 and the identified connection unit 43, the MSC 62 carries out a control so as to receive the message by this R-PORT 53. The message block which is received in this case must be the M block or the L block, and thus, this logical connection is continued as a normal connection if the received message block is the M block and the logical connection is ended as a normal connection if the received message block is the L block.

But if the received message block is the F block or the S block, some kind of protocol error exists, and the MSC 62 informs the connection unit 43 at the transmitting source via the PR-PORT 56 and the SNDC 59, and an abnormal end is made of the received R-PORT 53.

If the communication mode is the SPC mode, one of the R-PORTs 53 is prepared to receive the message block from the connection unit 43 at the transmitting source, and thus, the MSC 62 carries out a control so as to receive the message block by this R-PORT 53. In the SPC mode, similarly as in the case of the ANY mode, the first block is the F block or the S block, and the M block ends with the L block after a succession of the M blocks. In the case of the SPC mode, a temporary interruption is generated in the message which is transmitted depending on the renewal of the entry at the transmitting and receiving sides and the alternating process by the PS-PORT 55 in entry units caused thereby. In the SPC mode, it is also not permitted to have a plurality of logical connection relationships at the same time between the plurality of S-PORTs 51 of the same connection unit 43.

Normally, the transfer blocks of the message from the S-PORT 51 of other connection units 43 are transferred to the PR-PORT 56 of each connection unit 43. For this reason, the SMC 62 of each connection unit 43 must distribute the transfer block which is transferred to the R-PORTs 53 of its connection unit 43.

This distributing process is executed in units of transfer blocks which are the input unit while referring to the logical connection information managed by the R-PORT 53. The plurality of R-PORTs 53 of each connection unit 43 accurately receive the series of messages depending on the distribution process of this MSC 62.

Figure 16:
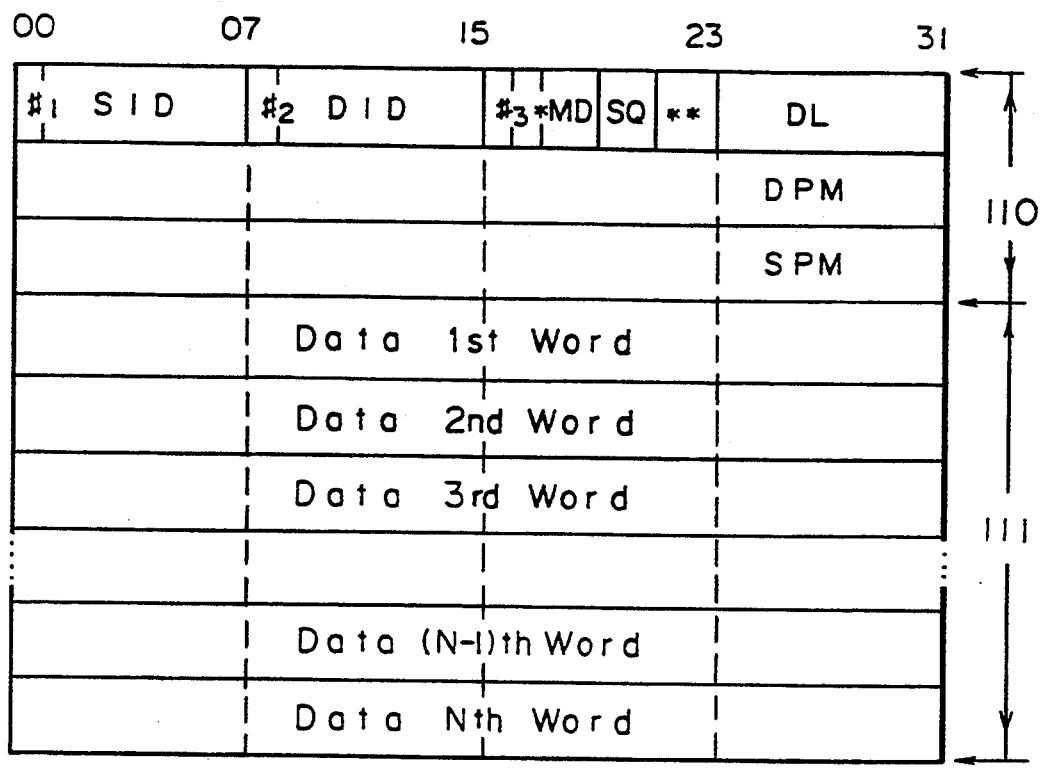
FIG. 16 is a diagram of an example of a data format of a message block on a system bus.

The above logical connection information is inserted in the header part of the command block (message). FIG. 16 shows an example of the format of the message block on the system bus 32. As shown in this figure, the message block is made up of a header part 110 and a data part 111. The data part 111 is made up of N words of data, where one word is made up of 4 bytes.

The 3 bits #1 to #3 within the header part 110 indicate the kind of transfer block, and indicate the message block when "010". In addition, SID and DID respectively indicate the source identifier and the destination identifier. The source identifier SID is an ID on the system bus of the transmission bus controller of the transfer block, and indicates the connection unit 43 of the transmission processing module in the case where the transfer block is the message block. The destination identifier DID is an ID on the system bus of the reception bus controller of the transfer block, and indicates the connection unit 43 of the reception processing module in the case where the transfer block is the message block. In addition, MD is a 2-bit identifier which indicates whether the mode is the ANY mode or the SPC mode, and indicates the ANY 0 mode if "00", the ANY 1 mode if "01" and the SPC mode if "10". SQ is a 2-bit block identifier and indicates the S block if "00", the F block if "01", the M block if "10" and the L block if "11". The buffer 90 within the MSC 62 shown in FIG. 8 described above stores the identifiers MD and SQ, and compares them in the comparator 96 with the signal from the generator 85 indicating whether the F block or the M block is awaited.

In addition, in FIG. 16, DL indicates the block length (length of data part 111) of the message block. DPM is a reception processing module ID of the message, and is normally identical to the above DID. SPM is a transmission processing module ID of the message, and is normally identical to the above SID.

Figure 17:
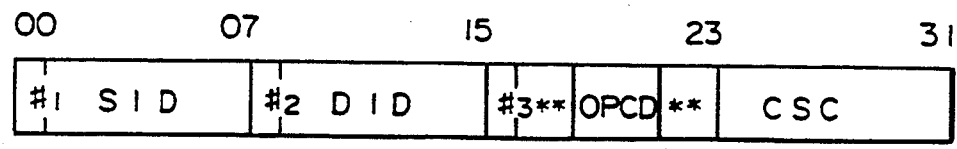
FIG. 17 is a diagram of an example of a data format of a status block on the system bus.

The status block on the system bus 38 indicating the process result of the received message has a format shown in FIG. 17. In this figure, the 3 bits #1 to #3 indicate the kind of transfer block, and the status block is indicated if "111". In addition, the source identifier SID is an ID on the system bus 38 of the transmission bus controller of the transfer block, and indicates the connection unit 43 of the reception processing module in the case of the status with respect to the message block, contrary to the SID of the message block.

The destination identifier DID is an ID on the system bus 38 of the reception bus controller of the transfer block, and indicates the connection unit 43 of the transmission processing module in the case of the status with respect to the message block. The 3-bit identifier OPCD indicates the transfer block to which the status belongs, and is the status block with respect to the message block if "010". Further, the code CSC indicates the process result within the reception processing module with respect to the transferred message block.

Next, a description will be given of an example of the distribution process of the PR-PORT 56 by referring to FIG. 18. The message blocks $A_F$, $B_F$, $C_F$, $A_{M1}$, $B_{M1}$, $C_{M1}$, . . . are alternately input to the number 0 PR-PORT $56_0$ and the number 1 PR-PORT $56_1$. The letters A, B, C and the like indicate the kind of message block, that is, examples of the connection units 43 of the message transmission processing module. In addition, the subscripts F, M and L indicate the above F block, M block and L block.

The MSC 62 distributes the transfer block $A_F$ which is transferred first to the number 0 P-PORT $53_0$ based on the SID and SPM of FIG. 16. Next, the transfer block $B_F$ transferred from the PR-PORT $56_1$ is distributed to the number 1 R-PORT $53_1$, the transfer block $C_F$ transferred from the PR-PORT $56_0$ is distributed to the number 2 R-PORT $53_2$, and distributes the transfer block $A_{M1}$ transferred from the PR-PORT $56_1$ to the number 0 R-PORT $53_0$.

Figure 18:
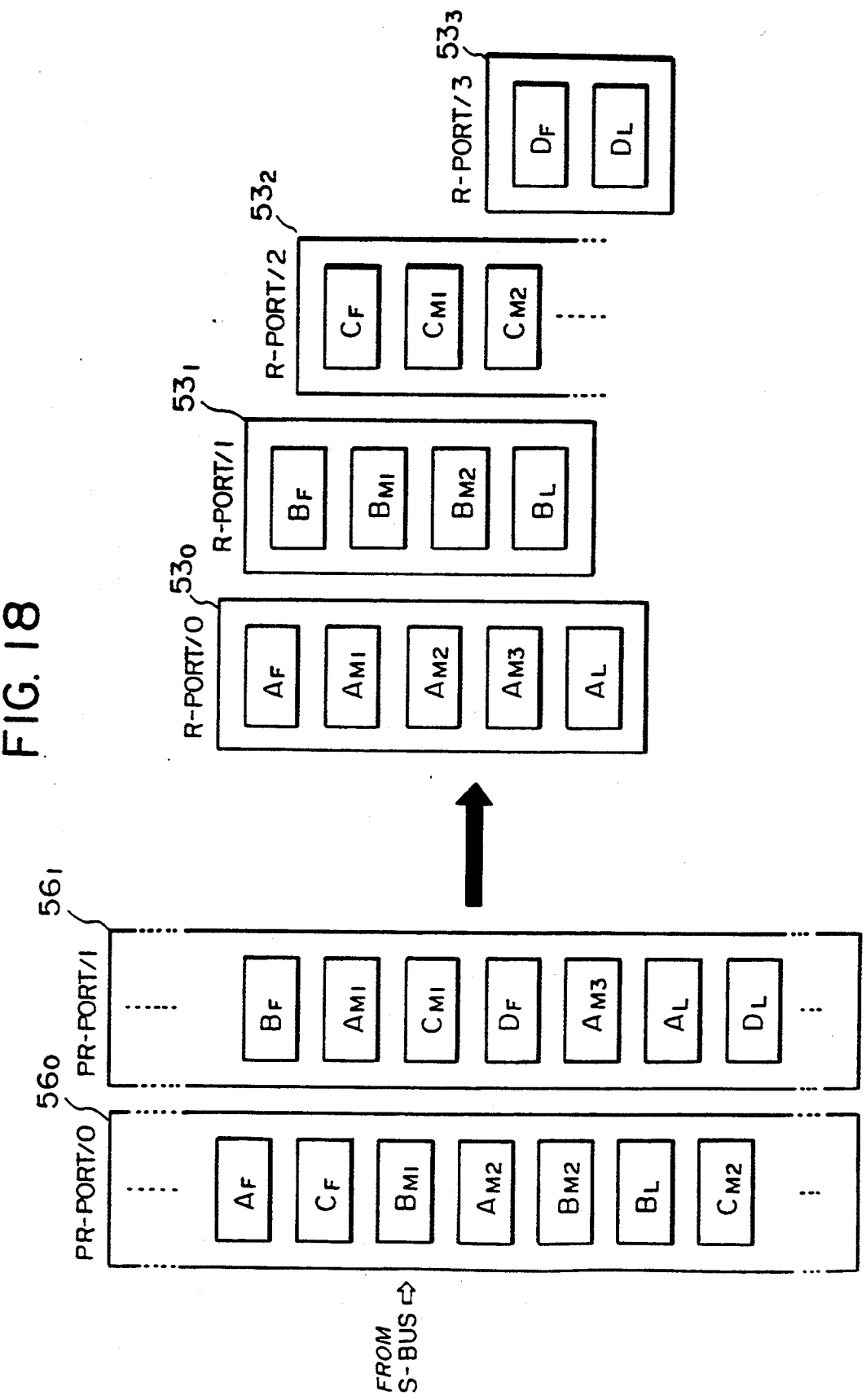
FIG. 18 is a block diagram of a physical receiving port distributing process.

Accordingly, the messages are transferred to the R-PORTs $53_0$ to $53_3$ in sequence for every message control as shown in FIG. 18, and it is possible to execute an accurate reception process of the message.

The common system bus 38 of this embodiment employs the split type, and the message communication includes the transfer of the message block having the data format shown in FIG. 16 from the transmitting side to the receiving side, and the transfer of the status block having the data format shown in FIG. 17 from the receiving side to the transmitting side. The series of logical messages are completed by repeating the message transfer and the status transfer a plurality of times.

Figure 19:
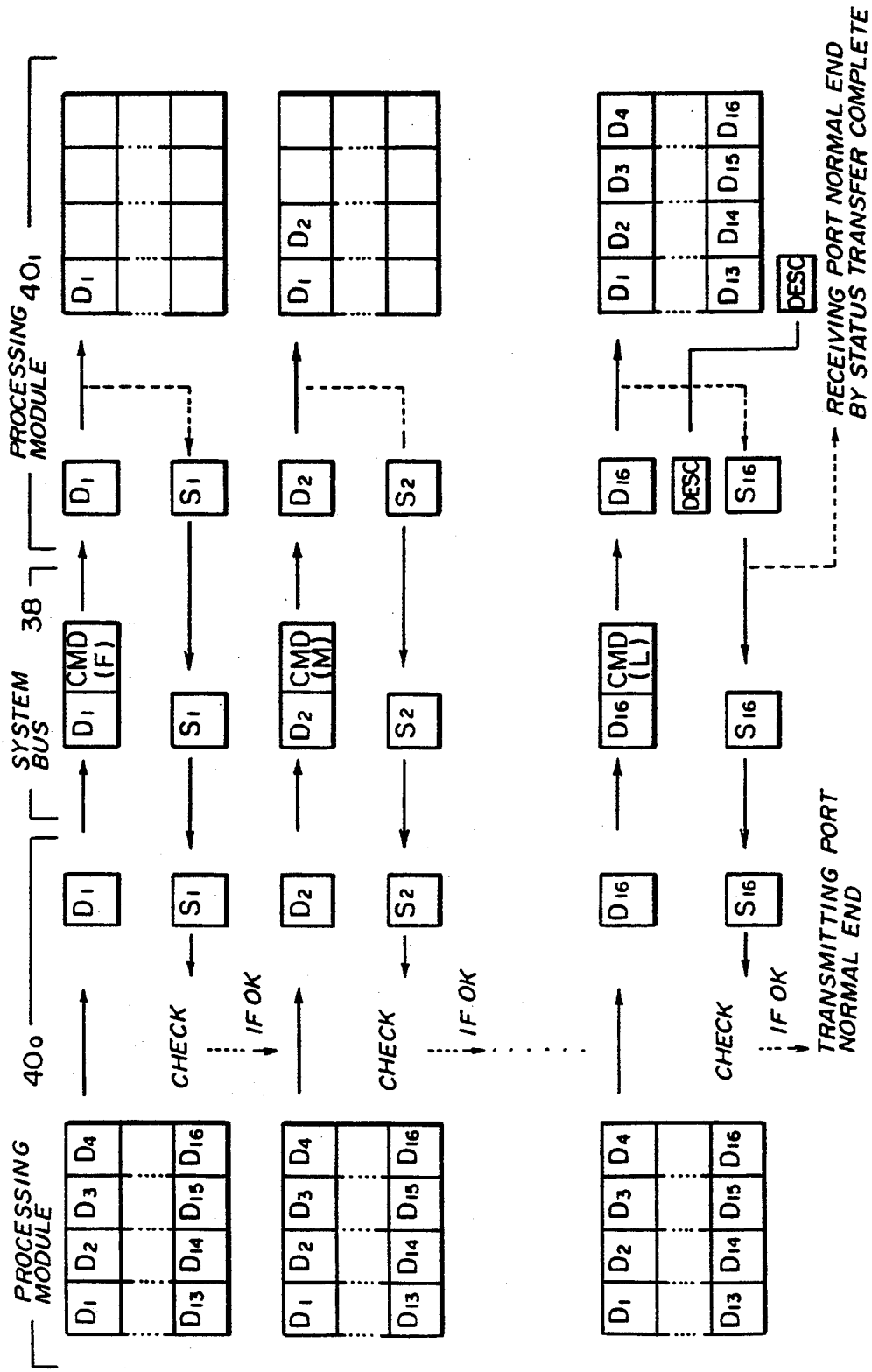
FIG. 19 is a diagram of a data transfer side between processing modules at the time of a normal end.
Figure 20:
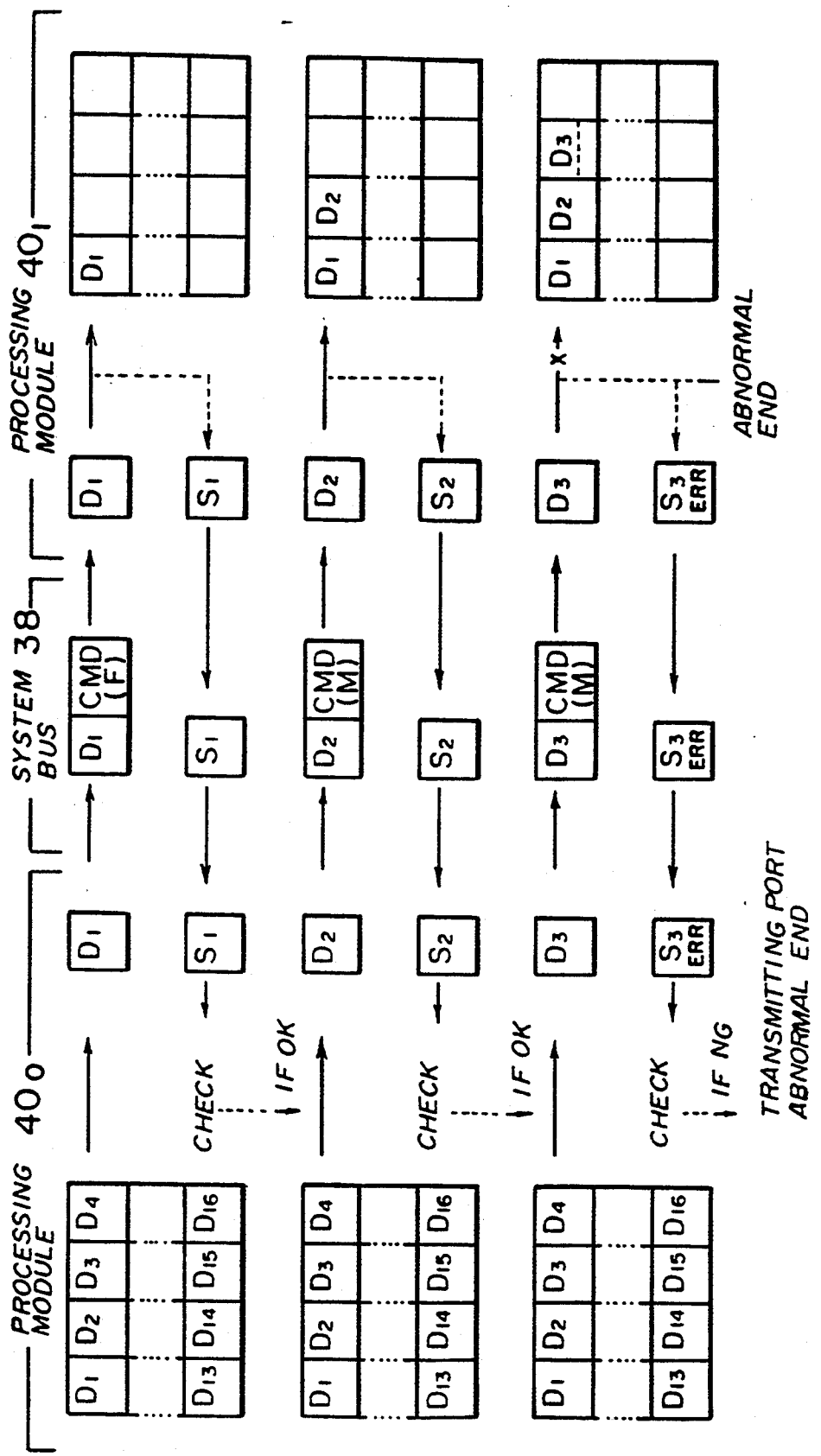
FIG. 20 is a diagram of a data transfer side between the processing modules at the time of an abnormal end.

The above status transfer is an operation which is carried out for the logical receiving port which receives the command to notify the process result to the logical transmitting port, and the logical transmitting port progresses the transfer of the command while confirming the status. FIG. 19 and FIG. 20 show examples of the data transfer between the processing module $40_0$ and the processing module $40_1$. The examples show the case where 4 KB data is transferred in the ANY mode. The 4 KB data is transmitted on the system bus 38 in 16 divisions (256 B per division). In FIG. 19 and FIG. 20, $D_1$ to $D_{16}$ describe 256 B data blocks, and are transmitted on the system bus 38 by adding the identifier (CMD: particularly F/M/L). $S_1$ to $S_{16}$ are the status with respect to each CMD.

The operation flow will be described according to FIG. 19. First, the processing module $40_0$ enters $D_1$ in the dual port RAM 61 by DMA transfer, and transmits it on the system bus 38 by adding a common identifier (F in FIG. 19). The processing module $40_1$ enters CMD and $D_1$ in the dual port RAM 61 within the connection unit 43, and the MSC 62 activates the logical receiving port 53 by investigating the contents of the CMD (command) within the dual port RAM 61. When the data part $D_1$ is transferred by the DMA transfer, the logical receiving port 53 generates $S_1$ from this result and transfers $S_1$ on the system bus 38 via the dual port RAM 61.

The processing module $40_0$ enters the transferred status $S_1$ and checks its content. If a normal end is confirmed by this check, the processing module $40_0$ enters the next data block $D_2$ in the dual port RAM 61 by DMA transfer, and transmits it on the system bus 38 by adding CMD (M) in the logical transmitting port 51.

The processing module $40_1$ enters CMD (M) and $D_2$ and checks the content of CMD (M), and starts the command reception process by selecting the same logical receiving port which received $D_1$.

When $D_2$ is transferred by the DMA transfer, the logical receiving port 53 generates $S_2$ from this result and transfers $S_2$ on the system bus 38 via the dual port RAM 61. The next data transfer is made if the processing module $40_0$ confirms the normal end from the content of the status $S_2$. The transfer is similarly repeated thereafter, and if the status $S_{15}$ of $D_{15}$ is normal, the last block $D_{16}$ of the entry (4 KB) is transferred to the dual port RAM 61 by DMA transfer and is transmitted on the system bus by adding CMD (L).

When the processing module $40_1$ receives CMD (L) and $D_{16}$, the processing module $40_1$ checks the content of the command and selects the same logical receiving port 53 as before to start the command reception process. Since CMD indicates (L), the logical receiving port 53 checks whether or not the total transfer data length up to that point exceeds one entry (4 KB), and transfers $D_{16}$ by the DMA transfer if it is not exceeded. Further, because one entry ends, the corresponding descriptor entry (DESC) is renewed (BCT and UID are stored), and the status $S_{16}$ is generated from the result up to that point. This status $S_{16}$ is transferred on the system bus 38 via the dual port RAM 61. When the transfer of the status is normally completed, the logical receiving port normally ends (C state). When the processing module $40_0$ enters the status $S_{16}$, the processing module $40_0$ checks its content and the logical transmitting port 51 normally ends (C state) if the content of $S_{16}$ is normal.

Next, the processing example for the abnormal case will be described using FIG. 20. The process is the same as that of the normal case up to the transfer of $D_2$. When transferring $D_3$, it is assumed that an abnormality (for example, address parity error and the like) is generated during the DMA transfer of $D_3$ by the logical receiving port 53. In this case, the DMA transfer is interrupted immediately, a status indicating the abnormality is generated from this result, and this status is transmitted on the system bus 38 via the dual port RAM 61. The logical receiving port 53 abnormally ends (C state) if the status $S_3ERR$ is transferred. The processing module $40_0$ which enters $S_3ERR$ which indicates the abnormality does not carry out an operation with respect to the next data block $D_4$, and abnormally ends (C state) immediately.

There are various kinds of abnormalities (that is, types of status) detected by the logical receiving port 53 during the command reception. In any case, the protocol (that is, the progressing of the transfer by the repetition of command→status→check→command→status→check→command→...) on the system bus 38 between the logical transmitting port and the logical receiving port is the same.

Next, a detailed description will be given of the fault processing of an essential part of this embodiment.

The abnormalities which may be generated during the series of message communication processes of the present invention can roughly be categorized into hardware error within the transmitting side processing module 40, hardware error within the receiving side processing module 40, hardware error during transfer on the common system bus 38, and software error of the receiving side processing module 40 including the flow control disturbance and the like.

The abnormality detection is carried out at various parts of the transmitting side connection unit 43, the common system bus 38 and the receiving side connection unit 43. Normally, before the logical connection between the transmitting side and the receiving side starts, the abnormality which is triggered and started by the start of the operation of the transmitting side is notified only to the software of the transmitting side processing module 40. In addition, the abnormality caused by the receiving operation is notified only to the software of the receiving side processing module 40.

On the other hand, after the logical connection between the transmitting side and the receiving side is generated, it is necessary to promptly release this logical connection state when some kind of fault is generated. For example, if the logical connection state is released only on the transmitting side and not on the receiving side, there is a possibility that the receiving side R-PORT 53 may hang up. In order to avoid such a situation, a hardware function is provided to release both logical connection states as much as possible. If the release is not possible by use of the hardware function alone, there is provided a hardware function which cooperates with the software to release the logical connection states.

The following 6 kinds of fault generations can be considered when categorized by the generation state.

① Fault generation during the message block processing of the transmitting side processing module 40;

② The fault generation during the message block transfer of the transmitting side processing module 40 (including fault on the system bus 38);

③ The fault generation during the message block processing of the receiving side processing module 40;

④ The fault generation on the system bus 38 during the status block transfer;

⑤ The fault generation after the status block transfer; and

⑥ The fault generation of the entire processing module 40.

Figure 21:
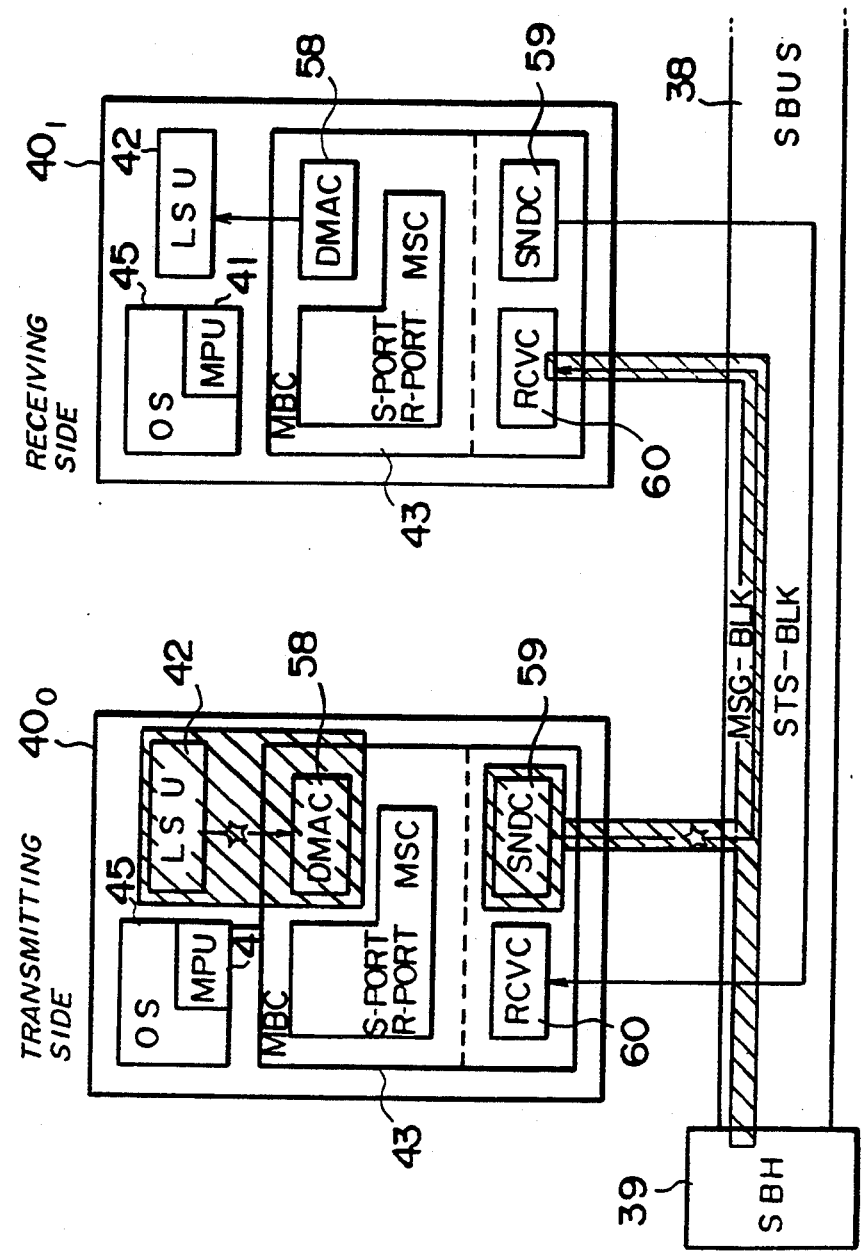
FIG. 21 is a block diagram of a processing operation at the time of a fault generation during a message block processing of a transmitting side processing module and during a data transfer.

As shown in FIG. 21, the fault generation ① occurs by the access by the DMAC 58 within the transmitting side processing module $40_0$ to a range outside the accessible range of LSU 42 or, by the parity error on the internal bus of the processing module $40_0$. In the former case, the fault generation is detected by the LSU 42 within the processing module $40_0$, and the fault generation in the latter case is detected by the LSU 42 or the DMAC 58 within the processing module $40_0$.

This fault generation is notified from the DMAC 58 to the S-PORT 51 via the MSC 62 within the transmitting side processing module $40_0$, and is further notified to the operating system (OS) 45. The OS 45 is the software which runs on the central processing unit (MPU) 41 and corresponds to the above data processing part 14. When the MSC 62 receives the above notification, it releases the logical connection state of the S-PORT 51. In addition, when the OS 45 receives the above notification, it reads out the end state information which is written in the SPCST register of the control register 52, and carries out a process of re-transmitting the same message because the logical connection state between the receiving side processing module $40_1$ may still be continued.

When the OS 45 which is the transmitting side software makes the immediate forced end request which will be described later, the forced end request is notified to the MSC 62 from the OS 45 via the S-PORT 51. The MSC 62 indicates the forced end of the process of the S-PORT 51, and notifies the end result to the OS 45 via the S-PORT 51.

Responsive to the above re-transmission process, the connection unit 43 of the receiving side processing module $40_1$ waits for the M block or the L block because of the logical connection state but the message of the F block is transmitted from the processing module $40_0$. Thus, the MSC 62 within the receiving side processing module $40_1$ detects the protocol violation and notifies this detection result to the OS 45 via the R-PORT 53 and releases the logical connection state of the R-PORT 53. The OS 45 within the processing module 400 transfers the status to the transmitting side processing module $40_0$ via the system bus 38. By this fault processing, the logical connection state is released on both the transmitting side and the receiving side.

In the case of the fault generation ②, when an error is generated on the system bus 38 which is transferring the message block (MSG-BLK) as shown in FIG. 21, this error is detected by the RCVC 60 or the system bus handler (SBH) 39 within the receiving side processing module $40_1$. This detection result is notified to the OS 45 within the transmitting side processing module $40_0$ in the sequence SNDC 59→MSC 62→S-PORT 51→OS45. At this time when the notification is made, the logical connection state on the transmitting side is already released by the MSC 62.

The OS 45 carries out the re-transmitting process similarly to the case of the above fault generation ① and transmits the F block. The receiving side processing module $40_1$ detects the abnormality because the block from the same module $40_0$ with the protocol violation is transferred to its MSC 62. Hence, the processing module $40_1$ releases the logical connection state on the receiving side and notifies this to the transmitting side processing module $40_0$.

Figure 22:
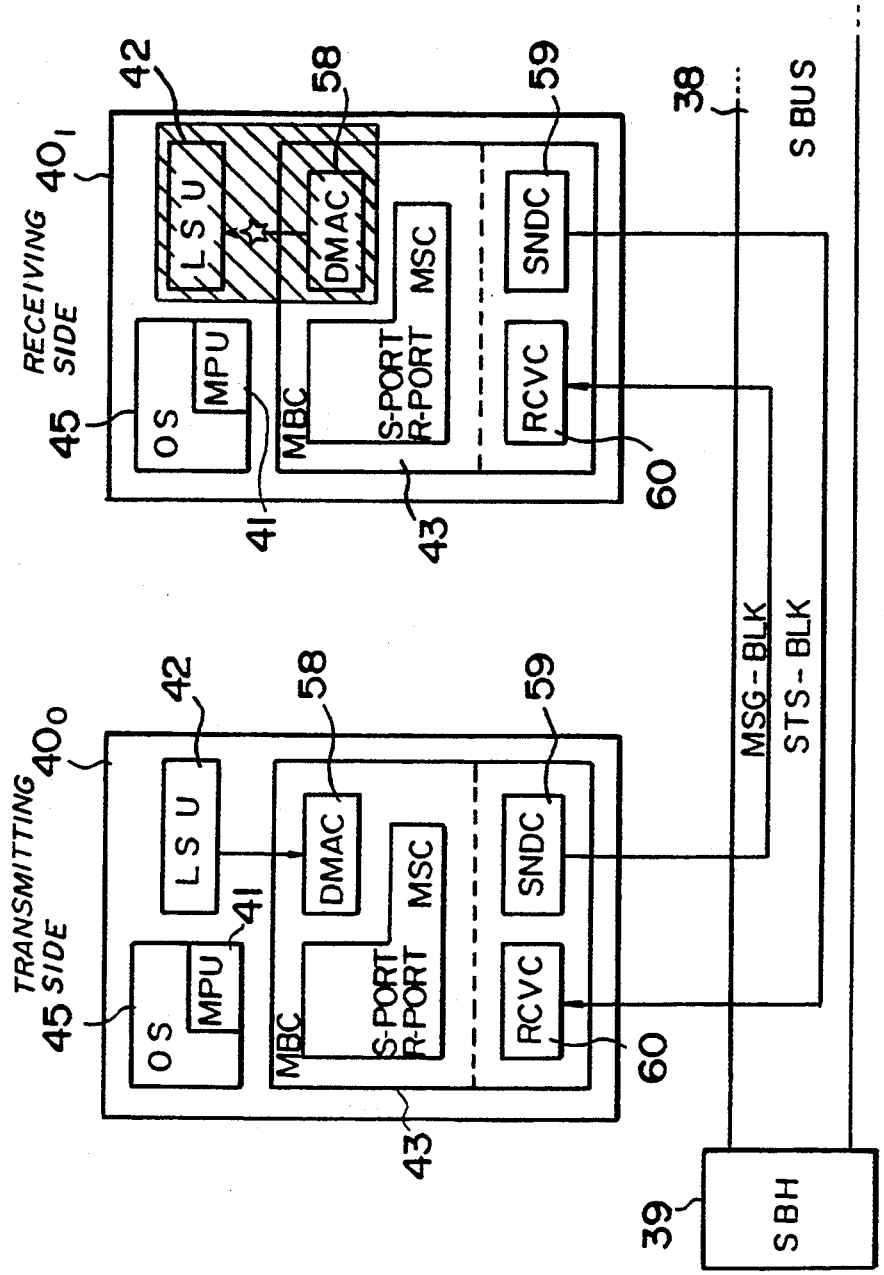
FIG. 22 is a block diagram of a processing operation at the time of a fault generation during a message block processing of a receiving side processing module.

Next, a description will be given of the process for the case of the fault generation ③. In this case, as shown in FIG. 22, the fault is caused by the access of the DMAC 58 within the receiving side processing module $40_1$ outside the accessible range of the LSU 42 or, by the parity error on the internal bus. The former fault generation is detected by the LSU 42 within the processing module $40_1$, while the latter fault is detected by the LSU 42 or the DMAC 58 within the processing module $40_1$.

The detection result of this fault generation is notified from the DMAC 58 within the processing module $40_1$ to the MSC 62. Responsive to this notification, the MSC 62 notifies the above detection result to the OS 45 within the processing module $40_1$ via the R-PORT 53, and releases the logical connection state of the R-PORT 53. Furthermore, the MSC 62 notifies the above detection result to the OS 45 by the status transfer via the MSC 62 and the S-PORT 51 within the transmitting side processing module $40_0$.

In the processing module $40_0$, the logical connection state of the S-PORT 51 is released by the notification of the above detection result to the MSC 62. Accordingly, at the time when the fault generation ③ is notified to both the OS s 45 of the transmitting and receiving side processing modules $40_0$ and $40_1$, the logical connection states of both the transmitting and receiving sides are released.

Figure 23:
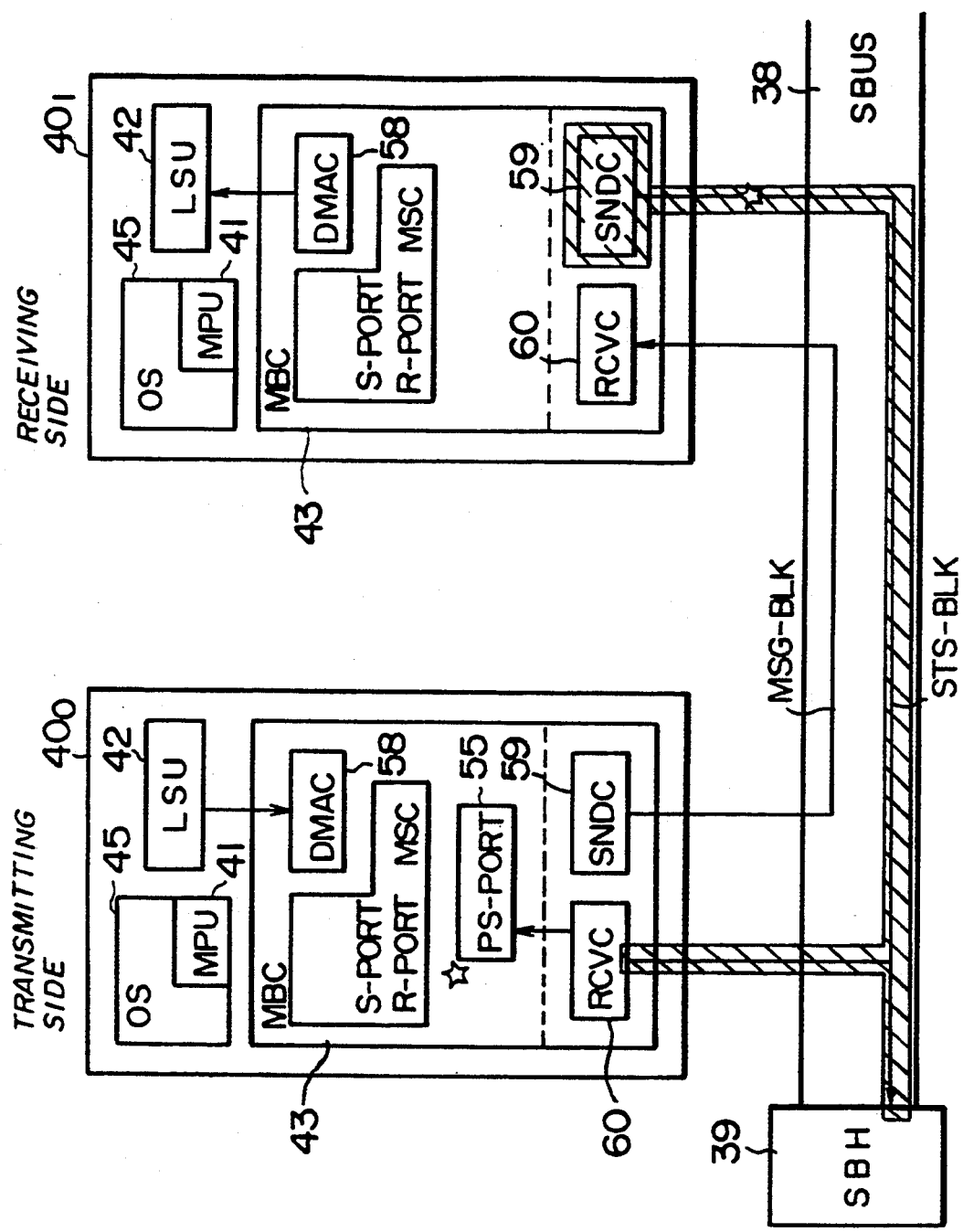
FIG. 23 is a block diagram of a processing operation at the time of a fault generation during a status block transfer from the receiving side processing module.

Next, a description will be given of the process for the case of the fault generation ④. In this case, as shown in FIG. 23, the fault is caused by the error during the transfer of the status block on the system bus 38. This fault is detected by the RCVC 60 or SBH 39 within the transmitting side processing module $40_0$.

The detection result of this fault generation is notified from the SNDC 59 within the processing module $40_1$ to the MSC 62. Responsive to this notification, the receiving side MSC 62 releases the logical connection state of the R-PORT 53 and notifies this by an external interrupt to the OS 45 which is the software running on the MPU 41. In this case, the transmitting side processing module $40_0$ continues the logical connection state and waits for the status block transfer. In addition, the connection unit 43 waits for the status transfer and operates a timer for waiting for the status transfer.

If the status transfer is not received even after a predetermined constant time elapses, the PS-PORT 55 of the transmitting side processing module $40_0$ detects a time out and notifies the transmitting side MSC 62. Then, the MSC 62 releases the logical connection state of the S-PORT 51, and notifies this to the OS 45 by an external interrupt. By this fault processing, it is possible to release the logical connection state on both the transmitting and receiving sides.

Next, a description will be given of the process for the case of the fault generation ⑤. In this case, the fault is caused by the immediate forced end request by the OS 45 within the receiving side processing module $40_1$.

Figure 24:
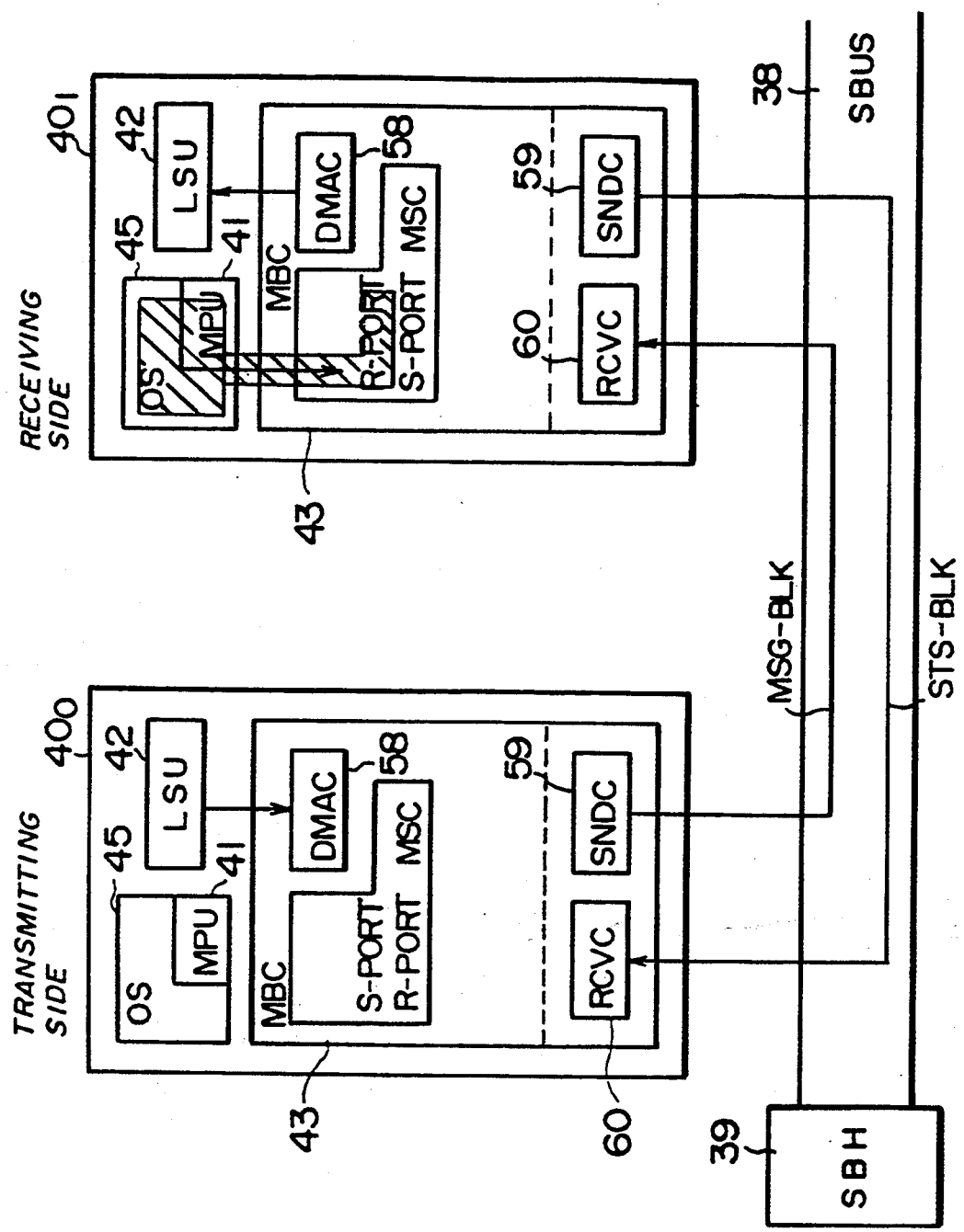
FIG. 24 is a block diagram of a processing operation at the time of a fault generation after the status block transfer from the receiving side processing module.

As shown in FIG. 24, the OS 45 within the receiving side processing module $40_1$ notifies the forced end request of the receiving side software to the MSC 62 via the R-PORT 53. As a result, the receiving side MSC 62 releases the logical connection state of the R-PORT 53 and notifies this to the receiving side OS 45 via the R-PORT 53 by an external interrupt.

The OS 45 which receives this notification carries out a re-reception process of the connection unit 43 of the receiving side processing module $40_1$ depending on the needs. If the re-reception process is carried out, the connection unit of the receiving side processing module $40_1$ waits for the F block or the S block.

On the other hand, the transmitting side processing module $40_1$ at this time still recognizes the logical connection state, and thus, continues to transmit the M block or the L block. Accordingly, in either case, the M block or the L block is transmitted to the processing module $40_1$ which is not waiting for the M block or the L block, and the receiving side MSC 62 detects the abnormality and notifies the fault generation to the transmitting side processing module $40_0$ by the status transfer.

Responsive to this notification, the connection unit 43 of the transmitting side processing module $40_0$ releases the logical connection state, and notifies the OS 45 within its module by an external interrupt. By this fault processing, it is possible to release the logical connection state on both the transmitting and receiving sides.

Figure 25:
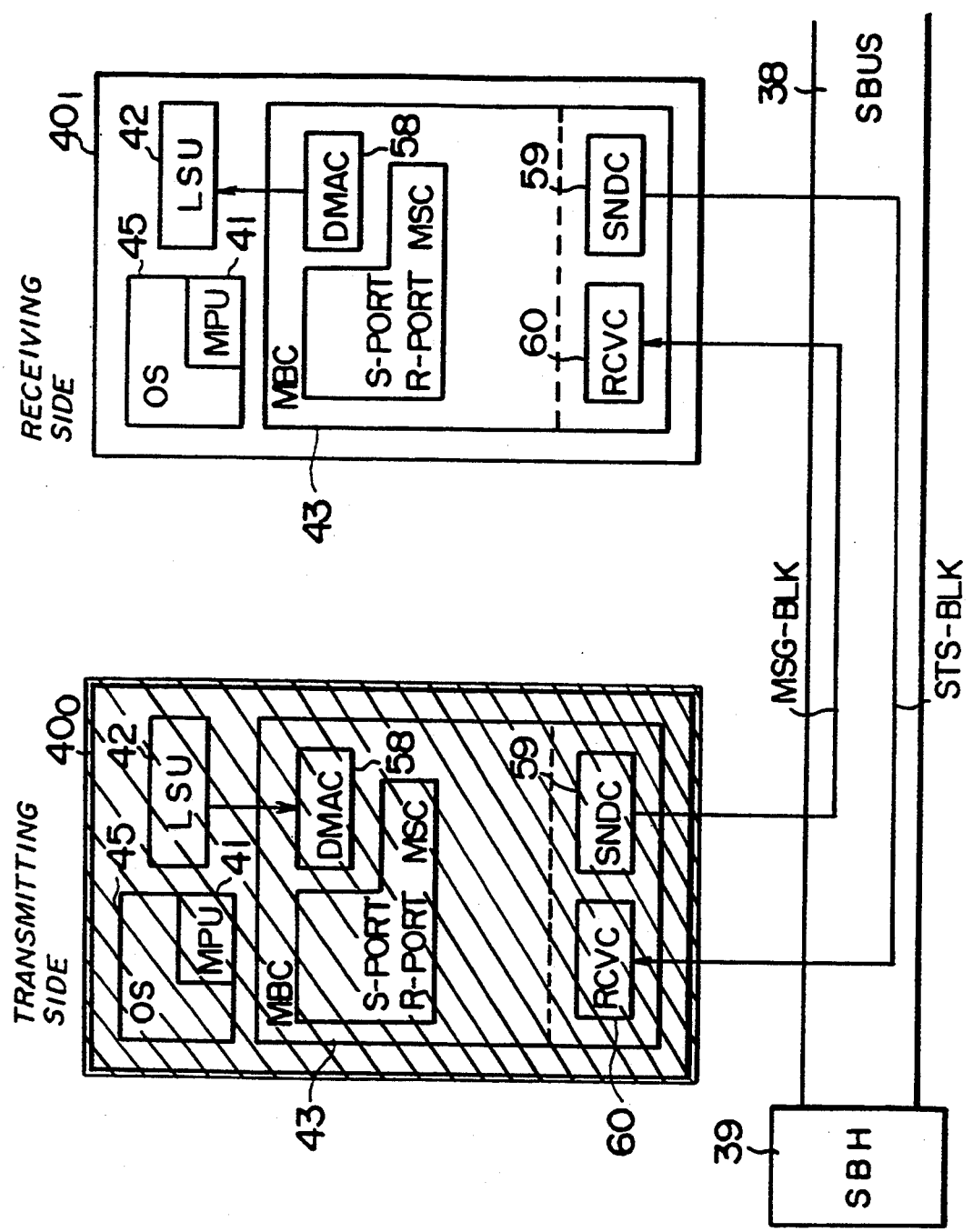
FIG. 25 is a block diagram of a processing operation at the time of a fault generation of the entire processing module.

Next, a description will be given of the process for the case of the fault generation ⑥. In this case, the transmitting side processing module $40_0$ is in a state incapable of making a re-transmission as shown in FIG. 25, and for example, the entire processing module $40_0$ may be down (hardware or software) or the connection unit (MBC) 43 may be down. In this case, the state of the transmitting side processing module $40_0$ is undetermined.

At the generation of this fault, the R-PORT 53 within the receiving side processing module $40_1$ waits for the next transfer message block (M block or L block), but hangs up because the next transfer message never arrives. The receiving side OS 45 monitors the operating state of the R-PORT 53 to determine whether or not the logical connection state is continued for over the predetermined constant time by periodically polling the indication information of the RPOPS register of the control register 54 described in conjunction with FIG. 12.

If the next transfer block (M block or L block) is awaited continuously for over the predetermined constant time, the receiving side OS 45 indicates the release of the logical connection state by writing the indication of the operating immediate forced end to the RPFCP register of the control register 54 described in conjunction with FIG. 12. By this fault processing, the logical connection state of the R-PORT 53 is released by the MSC 62 within the receiving side processing module $40_1$, the hang up of the logical connection state of the receiving side processing module $40_1$ caused by the heavy fault of the transmitting side processing module $40_0$ is eliminated, and the receiving side OS 45 recognizes this.

Figure 26:
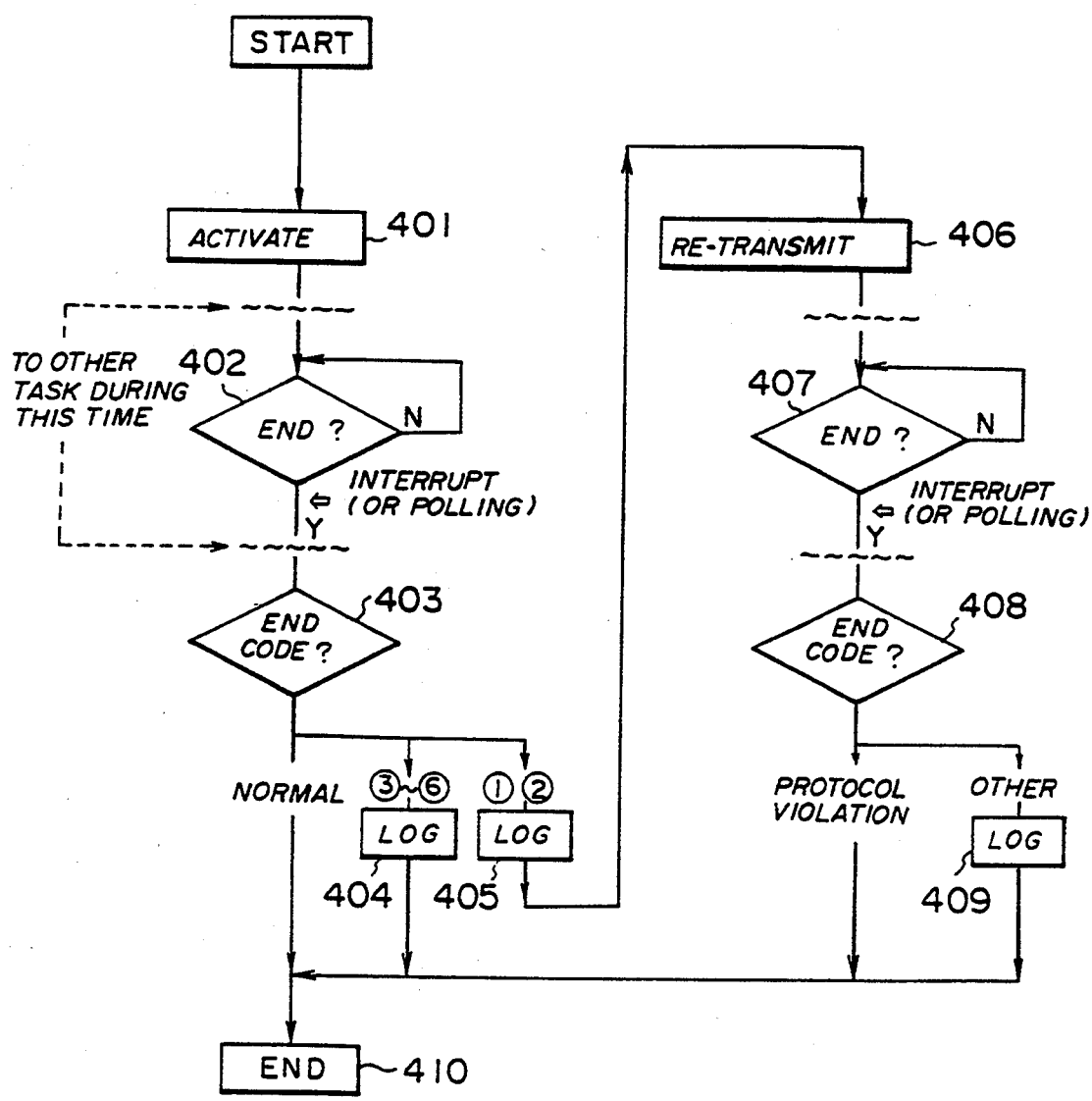
FIG. 26 is a flow chart for generally explaining a fault processing operation by the software of the transmitting side processing module.

Next, a description will be given of the processing operation of the OS 45 within the transmitting side processing module $40_0$ which receives the above fault generation notification, by referring to the flow chart of FIG. 26. In this figure, first the OS 45 after activation (step 401) decides from the content of the control register 52 whether or not the end request of the S-PORT 51 exists (step 402), and when the end request exists, the end code of the control register 52 is read by an interrupt or polling, to determine the type of fault (step 403).

The process is ended immediately in the normal case (step 410), a log is made if one of the fault generations ① to ⑥ is detected (step 404), and the process ends (step 410). On the other hand, if the fault generation ① or ② is detected in the step 403, the re-transmission process is carried out (step 406) after making the log (step 405), and the content of the control register 53 is used again to decide whether or not the end request of the S-PORT 51 thereafter exists (step 407).

If the end request exists, the end code of the control register 52 is read by an interrupt or polling, and a decision is made to determine whether or not there is a protocol violation (step 408). If there is a protocol violation, this process is ended (step 410). But if no protocol violation is detected, the log is made (step 409), and the process is ended (step 410).

Figure 27:
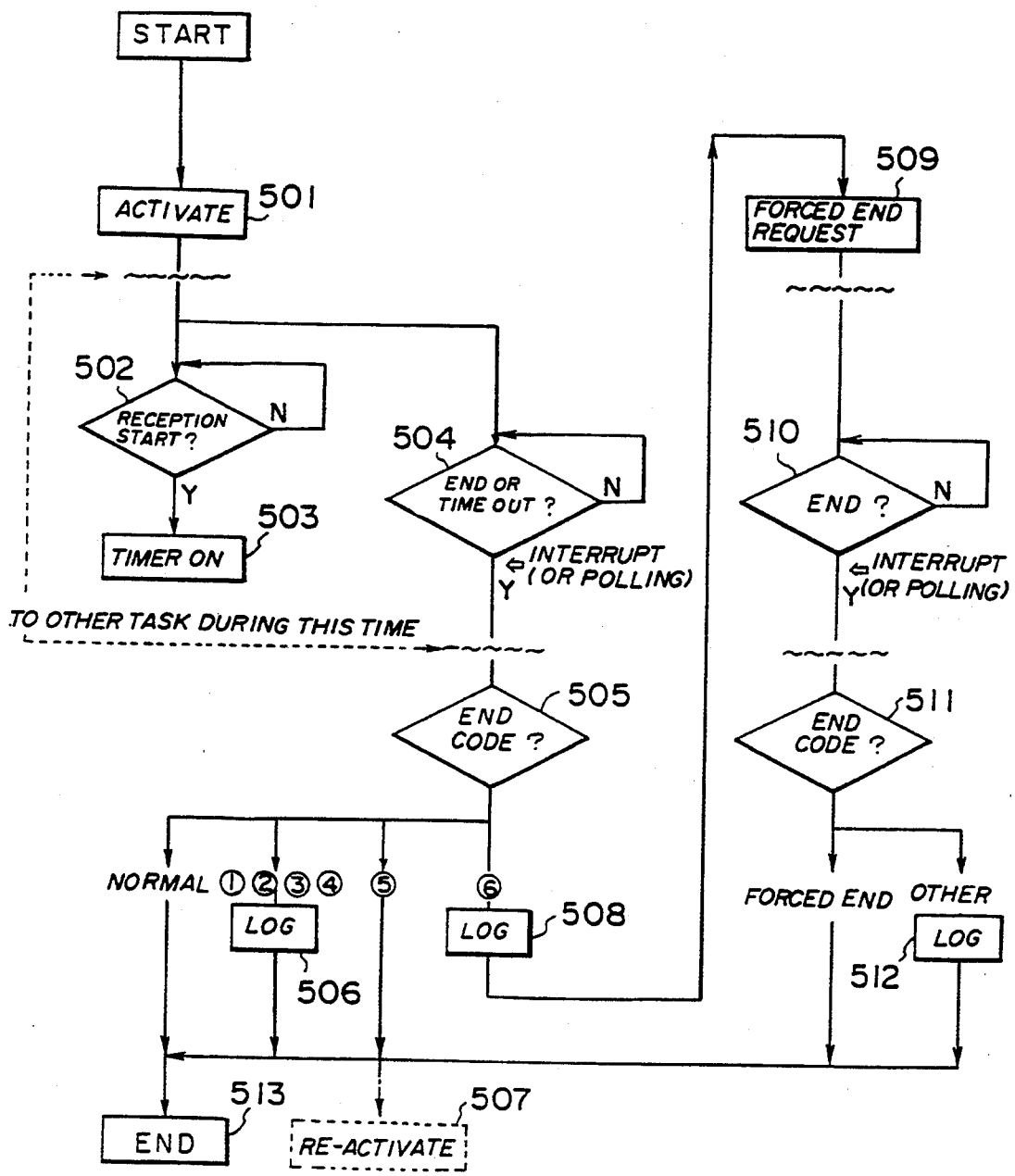
FIG. 27 is a flow chart for generally explaining a fault processing operation by the software of the receiving side processing module.

Next, a general description will be given of the processing operation of the OS 45 within the receiving side processing module $40_1$, by referring to the flow chart of FIG. 27. In this figure, first the OS 45 after activation (step 501) decides whether or not the reception of the message block is started (step 502), and turns ON the timer if the start of the reception is detected (step 503). In addition, after activation the OS 45 checks whether it is the end or the time out (step 504) of the message block. If the end request or the time out occurs, the end code of the control register 54 within the R-PORT 53 is read by an interrupt or polling to determine the type of fault (step 505).

If the end code indicates the normal state, the process is ended immediately (step 513). If the end code indicates one of the fault generations ① to ④, a log is made (step 506) and the process is ended. In addition, if the end code indicates the fault generation ⑤, the process is ended (step 513) or a re-activation is made (step 507) by the circumstances of the receiving side processing module $40_1$ independently of the transmitting side processing module 40 because the receiving side processing module $40_0$ at this time cannot determine the state of the transmitting side processing module.

In addition, if the above timer undergoes a time out due to the fault generation ⑥, the OS 45 makes a log (step 508), and after making the forced end request which will be described later (step 509), decides whether or not it is the end (step 510). If it is the end, the content of the end code of the control register 54 is read by an interrupt or polling (step 511), and the process is ended in the case of the forced end (step 513). In cases other than the forced end, a log is made (step 512) before ending the process (step 513).

Figure 28B:
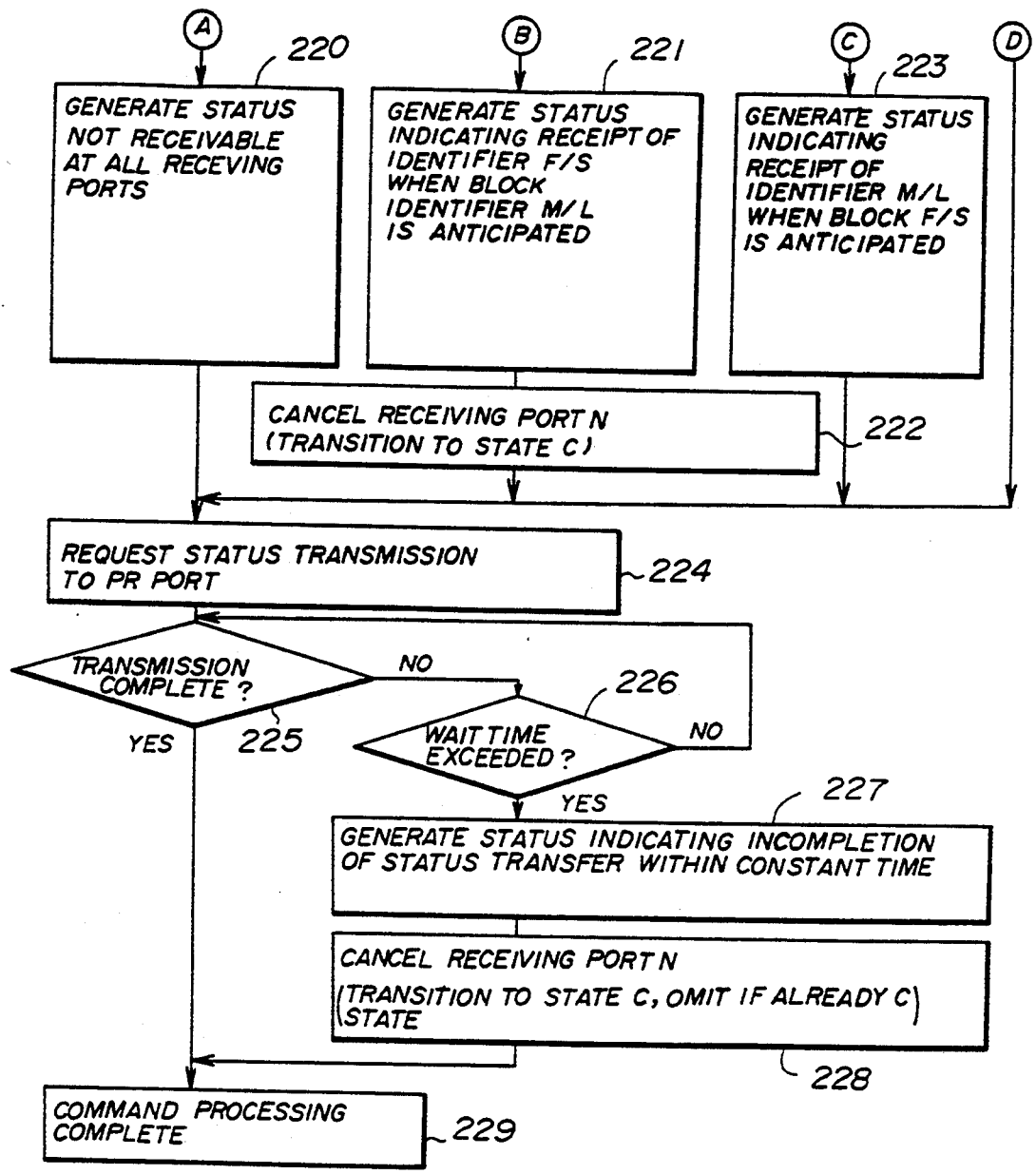

Next, a description will be given of the command processing operation for the case where the logical receiving port 53 receives the command, by referring to FIGS. 28A and 28B and FIG. 29. In FIG. 28A, when the logical receiving port 53 within the processing module 40 receives the command (step 201), the MSC 62 reads the block identifier and the identifier of the transmitting side processing module from the received command (step 202).

If the read block identifier is F or S, the MSC 62 checks the logical connection relationship of the logical receiving port 53 by the processes of steps 205 to 212. That is, after setting the receiving port number N to the first value "1" (step 205), a decision is made to determined whether or not all-of the logical receiving ports 53 have been checked (step 206). If not all logical receiving ports 53 have been checked, the MSC 62 decides whether the state of the logical receiving port is in the A state, the C state or another state (step 207). If the logical receiving port is not in the A state or the C state, a decision is made to determine whether the logical receiving port 53 is in the RDY1 state or the RDY2 state which will be described later (step 208).

In the case of the RDY1 state, a decision is made to determined whether the mode of the logical receiving port 53 is the ANY mode or the SPC mode (step 209), and the data of the logical receiving port 53 is transmitted to the dual port RAM 61 as described later if in the ANY mode (step 219).

On the other hand, if the step 208 detects the receiving port state as the RDY2 state and the SPC mode is detected in the step 209, a decision is made to determine whether or not the processing module identifier matches its own identifier (steps 210 and 211). If there is no match, the process advances to the step 212 similarly as in the case where the A state or the C state is detected in the step 207, and the process returns to the step 206 by incrementing the receiving port number N by 1.

In addition, if the block identifier is detected as M or L in the step 203, the MSC 62 checks the logical connection relationship to the logical receiving port 53 by the processes of steps 214 to 217. That is, the receiving port number N is first set to an initial value "1" (step 214), and a decision is made to determine whether or not all of the logical receiving ports have been checked (step 215). If not all logical receiving ports have been checked, a decision is made to determine whether or not the state of the logical receiving port 53 having the receiving port number N is in the RDY2 state (step 216), and a decision is made to determine whether or not the module identifier matches that of itself if in the RDY2 state (step 217). If the logical receiving port 53 having the receiving port number N is in a state other than the RDY2 state (step 216) or, if the module identifiers do not match (step 217), the receiving port number N is incremented by "1" and the next logical receiving port 53 is specified (step 218), and the process thereafter returns to the step 215.

On the other hand, if the check of all logical receiving ports 53 which receive the data block with the block identifier F or S ends (step 206), the process advances to a step 220 shown in FIG. 28B, and a status is generated which cannot be received by all logical receiving ports 53. In addition, the process advances to a step 221 shown in FIG. 28B if the module identifier of the logical receiving port which is in the RDY2 state out of the logical receiving ports 53 which receive the data block with the block identifier F or S matches that of the command. Hence, a status indicating that the block identifier F or S is received when the block identifier M or L is anticipated, the present receiving port number N is thereafter cancelled in step 222, and the state of the logical receiving port 53 undergoes a transition to the C state which will be described later (at this time, however, no notification is made to the OS).

In addition, if the check of all logical receiving ports 53 which receive the data block with the block identifier M or L ends (step 215), the process advances to a step 223 shown in FIG. 28B, and a status is generated which indicates that the block identifier M or L is received when the block identifier F or S is anticipated.

If the step 209 decides that the received data block at the logical receiving port 53 is of the ANY mode or, if the step 211 or 217 detects a match of the module identifiers, the process advances to a step 219, and the data transfer is carried out according to a subroutine which will be described later. After this data transfer ends or, if the process of one of the steps 220, 222 and 223 ends, the process advances to step 224, and the MSC 62 requests transmission of the generated status with respect to the physical receiving port (PR-PORT) 56 (step 224).

The status transmission from the physical receiving port 56 is carried out at the above request. When the status transmission is completed (step 225), the command processing is completed (step 229). On the other hand, if the waiting time is exceeded without completing the status transmission from the physical receiving port 56 (steps 225 and 226), a status which indicates that the status transfer was not completed within a constant time is generated (step 227), the logical receiving port 53 having the receiving port number N undergoes a state transition to the C state (step 228), and the command processing is completed (step 229). If the logical receiving port 53 having the receiving port number N is already in the C state at the step 228, this C state is maintained (a notification is made to the OS at this time).

Next, a detailed description will be given of the data transfer by the logical receiving port 53 at the step 219, by referring to FIG. 29. The MSC 62 reads the transfer data length within the command (step 301), and reads out each content of the BCT information field and the BUFA information field from the descriptor information which is held in the control register 54 within the logical receiving port 53 having the receiving port number N (step 302).

Then, a decision is made to determine whether or not a data transfer length error is generated (step 313). If no error is generated, the data is transferred to the LSU 42 by the direct memory access (DMA) transfer (step 304), and thereafter a check is made to determined whether or not the data transfer error is generated at the time of this DMA transfer (step 305). If no data transfer error exists, a decision is made to determine whether or not the transferred data is of the boundary of the descriptor entry (step 306), and if the boundary of the descriptor within the LSU 42 is renewed by the software (step 307).

After checking whether or not the data transfer error is generated when renewing this descriptor (step 308), a decision is made to determine whether the mode of the received data block at the logical receiving port 53 having the receiving port number N is the ANY mode or the SPC mode (step 309). If in the SPC mode, the next descriptor is entered so as to receive the message using the arbitrary form buffer as described above (step 310), and a check is made to determined whether or not the data transfer error is generated (step 311). If no data transfer error exists, the descriptor format is checked (step 312), and a decision is made to determine whether or not all received data are stored in the LSU if there is no indication mistake (step 319). If stored, a status indicating the normal end is generated (step 313), and the data transfer ends (step 320). If not all data are stored in the LSU, the process returns from the step 319 to the step 302.

On the other hand, if the generation of the data transfer length error is detected at the step 303, a status is generated which indicates that the total size of the received data has exceeded the size of the logical buffer given by the BCT information field or that there is no match to the size information from the BCT information field in the SPC mode (step 314). Thereafter, the logical receiving port 53 having the receiving port number N undergoes a state transition to the C state (step 315).

If the data transfer error is detected at the step 305, a status is generated which indicates that the transfer error is generated during the transfer of the received data (step 316), and the process advances to the step 315. In addition, if the data transfer error is generated at the step 308 or 311, a status is generated which indicates that the transfer error is generated during the transfer of the descriptor (step 317), and the process advances to the step 315. Furthermore, if the indication is detected at the step 312, a status is generated which indicates that the content of the descriptor includes an indication mistake (step 318), and the process advances to the step 315.

If the step 306 decides that the transfer data is not the descriptor entry boundary and if the step 309 detects the ANY mode, a status is generated which indicates the normal end (step 313), and the data transfer is thereafter ended (step 320). Even after the logical receiving port 53 undergoes the state transition to the C state at the step 315, the data transfer ends (step 320).

Next, a detailed description will be given of the operation process of the S-PORT 51.

Figure 30:
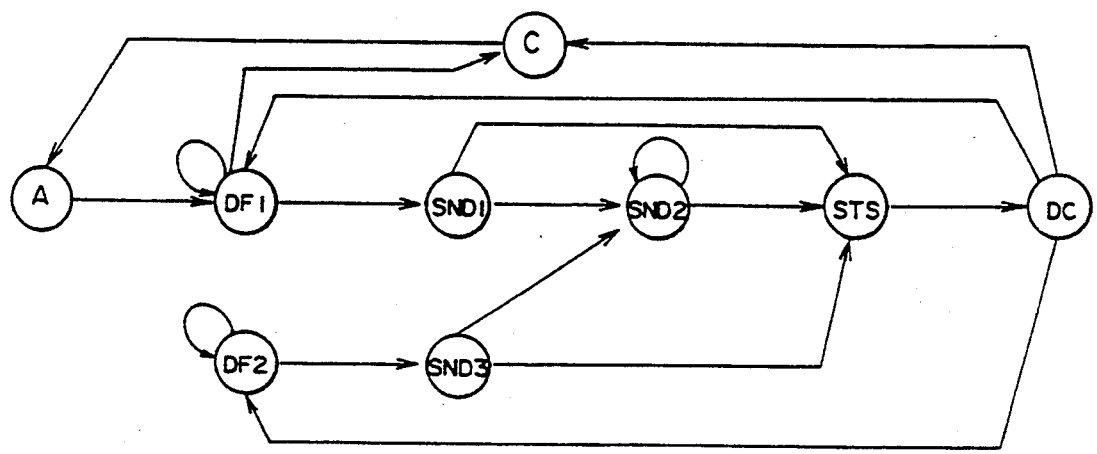
FIG. 30 is a state transition diagram of an embodiment of a logical transmitting port according to the present invention.

The series of transmitting operations according to the indication of the software running on the central processing unit 41 is managed by the S-PORT 51. This S-PORT 51 executes the message transmitting process according to the Operation indication to the MSC 62 and the operation indication to the DMAC 58 and the PS-PORT 55 via the MSC 62. FIG. 30 shows a state transition diagram of the process executed by the S-PORT 51. The operation condition of each state of the S-PORT 51 is indicated below.

A State

The A State waits for the operation indication from the software. A state transition is made to the DF1 state by the write access of the communication mode of the control register 52 with respect to the PODF register.

DF1 State

This is a descriptor fetch operation state. By the MSC 62 and the DMAC 58 and according to the address state indicated by the SPCSA register of the control register 52, one entry of the descriptor chain is loaded from the local storage unit 42 to the work region for the logical transmitting port within the dual port RAM 61 to make a state transition to the SND1 state. If the BC bits of the loaded entry indicates the branching, the DF1 state is maintained, and the SPDSA register of the control register 52 is rewritten to the branch address.

SND1 State

The transfer block of the first message is fetched from the logical buffer specified by the loaded entry, and a transmission request is issued with respect to the PS-PORT 55. The transfer block which is fetched is stored in the holding buffer of the logical transmitting port provided within the dual port RAM 61. In this case, the block which is transferred is assigned the identifier F or S depending on its block size. If the identifier F is assigned, a state transition to the SND2 state occurs, and a state transition to the STS state occurs if the identifier S is assigned.

SND2 State

In correspondence with the common system bus 38 employing the split bus system, the answer with respect to the transferred block is awaited. At the same time, the next transfer block is fetched after receipt of the answer, and the transmission request is issued with respect to the PS-PORT 55. In this case, the identifier M or L is assigned to the block which is transferred. The SND2 state is held if the identifier M is assigned, and a state transition is made to the STS state if the identifier L is assigned.

STS State

The STS State waits for the answer with respect the block which is transferred last. A state transition is made to the DC state after receipt of the answer.

DC State

In order to move the processing entry, the SPDSA register of the control register 52 is renewed (16 byte addition). When the continuation of the descriptor is indicated by the BC bits of the entry for which the process is completed, a state transition is made to the DF1 state if the communication mode is the ANY mode and a state transition is made to the DF2 state if the communication mode is the SPC mode. On the other hand, if no continuation is indicated by the BC bits, a state transition is made to the C state.

DF2 State

It is the same as the DF1 state excluding the state transition to the SND3 state after completion.

SND3 State

The first transfer block is fetched from the logical buffer specified by the loaded entry, so as to issue the transmission request with respect to the PS-PORT 55. The transfer block which is fetched is stored in the holding buffer for the logical transmitting port provided within the dual port RAM 61. Although the entry has been changed, the identifier M or L is assigned to the block which is transferred in correspondence with the SPC mode. A state transition is made to the SND2 state if the identifier M is assigned, and a state transition is made to the STS state if the identifier L is assigned.

C State

This is a state in which the series of transfer operations at the S-PORT 51 is ended. A state transition is made to this state also in the case of an abnormal end when various abnormalities are detected at each of the states. A state transition is made to the A state if the fetch operation with respect to the SPCST register (written with in the end information) of the control register 52 is executed by the software.

Next, a detailed description will be given of the operation process of the R-PORT 53.

The series of receiving operations according to the indication of the software running on the central processing unit 41 is managed by the R-PORT 53. This R-PORT 53 executes the message transmission process depending on the operation indication to the MSC 62 and the operation indication to the DMAC 58 and the PR-PORT 56 via the MSC 62.

Figure 31:
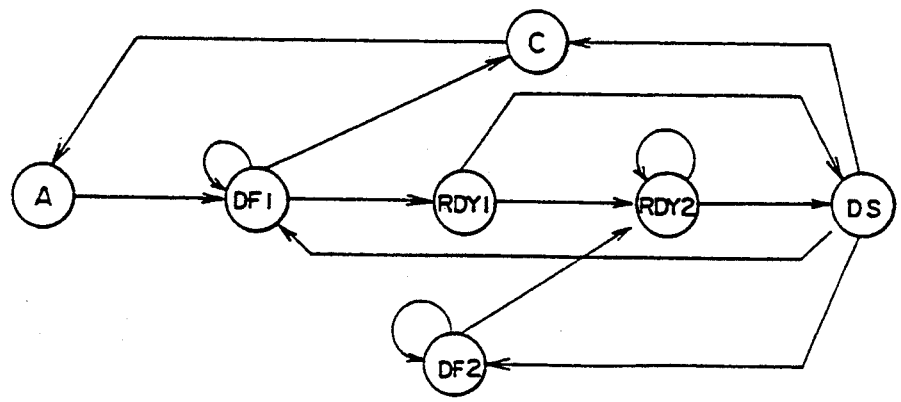
FIG. 31 is a state transition diagram of an embodiment of a logical receiving port according to the present invention.

FIG. 31 shows a state transition diagram of the process executed by this R-PORT 53. The operating conditions at each state of this R-PORT 53 is indicated below.

A State

The A State is a state in which the operation indication from the software is awaited. A state transition is made to the DF1 state by the write access of the operation mode with respect to the RPODF register of the control register 54.

DF State

The DF State is a descriptor fetch operation state. By the MSC 62 or DMAC 58, one entry of the descriptor chain is loaded to the work region for the logical receiving port within the dual port RAM 61 from the logical storage unit 42 depending on the address information specified by the RPDSA register of the control register 54, and a state transition is made to the RDY1 state.

If the BC bits of the loaded entry indicates the branching, the DF1 state is maintained, and the RPDSA register of the control register 54 is rewritten to the branch address.

RDY1 State

The RDY1 State is a state in which the receipt of the transfer block of the first message to the loaded entry is waited. If the identifier of the received transfer block is F or S, the PR-PORT 56 specifies the R-PORT in the matching communication mode out of the R-PORTs 53 in the RDY1 state, and executes a logical connection between this specified R-PORT.

When this logical connection is realized, this R-PORT stores the transfer block which is stored in the holding buffer for the logical receiving port provided within the dual port RAM 61 into the logical buffer which is specified by the loaded entry.

After this store process is completed and if the identifier of the received transfer block is F, an answer transmission request is issued to the common system bus 38 to make a state transition to the RDY2 state. If the identifier of the received transfer block is S, a state transition is made to the DS state by holding the answer transmission request to the common system bus 38. If the communication mode is the SPC mode and the block cannot be stored in its entirety into the specified logical buffer, a state transition is made to the DS state during the store operation. In this case, the answer transmission request to the common system bus 38 is also held.

RDY2 State

The RDY2 State is a state of waiting for the receipt of the next transfer block, and the R-PORT 53 already has the logical connection relationship to the S-PORT 51 of another processing module 30. If the identifier of the received transfer block is M or L, the PR-PORT 56 specifies the R-PORT which is to receive out of the R-PORTs 53 in the RDY2 state, and executes a logical connection between this specified R-PORT.

When this logical connection is realized, this R-PORT stores the transfer block which is stored in the holding buffer for the logical receiving port provided within the dual port RAM 61 into the logical buffer which is specified by the loaded entry. After the store process is completed and when the identifier of the received transfer block is M, the RDY2 state is held by issuing the answer transmission request to the common system bus 38. If the identifier of the received transfer block is L, the answer transmission request to the common system bus 38 is held and a state transition is made to the DS state.

If the communication mode is the SPC mode and the block cannot be stored in its entirety into the specific logical buffer, a state transition is made to the DS state during the store operation, and in this case, the answer transmission request to the common system bus 38 is also held.

State

The DS State is a state of writing the processing situation into the entry after processing of the loaded entry is completed. The information is written into the BCT information field, the UID information field and the like of the entry. Further, the RPDSA register of the control register 54 is renewed (16 byte addition) so as to move the processing entry to the next. If the communication mode is the ANY mode, the answer transmission request to the common system bus 38 held in the RDY1 state or the RDY2 state is issued.

When the continuation of the descriptor is indicated by the BC bits of the entry the processing of which is completed, a state transition is made to the DF1 mode if the communication mode is the ANY mode, and a state transition is made to the DF2 mode if the communication mode is the SPC mode. On the other hand, a state transition is made to the C state if no continuation is indicated by the BC bits.

DF2 State

The second and subsequent entries are fetched if the communication mode is the SPC mode, and if necessary, the answer transmission request to the common system bus 38 held in the RDY1 state or the RDY2 state is issued. The rest of the operation is otherwise the same as that for the DF1 state.

C State

The C State is a state in which the series of transfer operations at the R-PORT 53 are ended. A state transition is made to this state also in the case of the abnormal end when various abnormalities are detected in each state. For example, if the MSC 62 detects the transfer of the message of the F block in the RDY2 state of the R-PORT 53, the state of this R-PORT 53 is changed to the C state. A state transition is made to the A state when the fetch operation is executed by the software with respect to the RPCST register (written with end information) of the control register 54.

The construction and operation of the physical transmitting port (PS-PORT) 55, the physical receiving port (PR-PORT) 56, the access control unit (BSC) 57, the memory access control unit (DMAC) 58, the transmission control unit (SNDC) 59, the reception control unit (RCVC) 60 and the main sequence control unit (MSC) 62 which are other constituent units of the connection unit 43 differ depending on the PM internal bus 44 and the common system bus 32 which are actually used. The MSC 57 and the DMAC 58 are dependent on the PM internal bus 44, the PS-PORT 55 and the PR-PORT 56 are dependent on the common system bus 32, and the MSC 62 is dependent on the implement.

Next, a description will be given of the end interface between the hardware and software.

The software which runs on the central processing unit 41 can recognize the progress situation of the processing of each entry of the descriptor chain by the following three means.

That is, as first means, the indication data of the control register 52 belonging to each S-PORT 51 is monitored, and the indication data of the control register 54 belonging to each R-PORT 53 is monitored. The address information in the local storage unit 42 of the entry of the descriptor which is being processed is written into the SPOPS register and the RPOPS register of these control registers 52 and 53 as described above, and the software can be aware of the progress situation of the processing by monitoring such.

As second means, "1" is set in the D bit of the entry of the descriptor. When "1" is set in the D bit, an external interrupt is made with respect to the software at the time when the processing of this descriptor is completed. Hence, the software can be aware of the progress situation of the processing by this external interrupt.

These two methods are used when the processing of each entry of the descriptor chain is progressing normally. In this case, although the entry of the descriptor of the S-PORT 51 remains the same, a content dependent on the received message is written into the entry of the descriptor of the R-PORT 53.

In other words, in the ANY mode, the received message size is written in the BCT information field of each entry, the next address of the last data is written in the BUFA information field, and the unit number of the connection unit 43 of the processing module 40 at the transmitting source is written in the UID information field. On the other hand, in the SPC mode, only the BUFA information field and the UID information field are rewritten. The software of the receiving side processing module 40 can recognize the message size and the transmitting source based on this information. When the last entry of the descriptor chain is completed, the connection unit 43 generates an external interrupt with respect to the software regardless of the D bit.

As the third means for being aware of the progress situation of the processing, an external interrupt is generated with respect to the software when the abnormality of the process is detected, and the end information describing the content of the abnormality is written into the SPCST register and the RPCST register of the control registers 52 and 54. Hence, the software can be aware of the progress situation of the processing only from this external interrupt, and can be aware of the details of the abnormality content by referring to this end information. The software recognizes the entry in which the abnormality is generated according to the SPOPS register and the RPOPS register of the control registers 52 and 54.

Even in the case where the processing of all entries of the descriptor which is prepared in advance normally ends, an external interrupt is similarly generated with respect to the software. In this case, end information indicating the normal end is indicated by the SPCST register and the RPCST register.

In this embodiment, the software which runs on the central processing unit 41 includes means for indicating the end of the processing of each S-PORT 51 and each R-PORT 53 during the processing of the descriptor chain.

In other words, by writing the indication of the forced end to the SPFCP register of the control register of the S-PORT 51, the software indicates the forced end of the processing of this S-PORT 51. On the other hand, by writing the indication of the forced end to the RPFCP register of the control register 54 of the R-PORT 53, the software indicates the forced end of the processing of this S-PORT 51.

When indicating the end, there are two kinds of forced end modes. One forced end mode indicates the forced end after the processing of the entry which is presently being processed is completed. The other forced end mode indicates the immediate forced end regardless of the entry processing state.

When the software indicates the forced end of the processing of the S-PORT 51, the software sets a flag in the "N" region of the SPFCP register of the control register 52 shown in FIG. 11 if executing the forced end according to the former mode. On the other hand, when executing the forced end according to the latter mode, the software sets a flag in the "I" region of the SPFCP register.

In addition, when indicating the forced end of the processing of the R-PORT 53, a flag is set in the "N" region of the RPFCP register of the control register 54 shown in FIG. 12 if executing the forced end according to the former mode. On the other hand, when executing the forced end according to the latter mode, a flag is set in the "I" region of the RPFCP register.

When the indication of the forced end according to the former mode is written in the SPFCP register and the RPFCP register of the control registers 52 and 54 by the software, the MSC 62 executes the forced end process at the time when the completion of the processing of the entry being processed is confirmed by monitoring the progress situation of the processing of the S-PORT 51 and the R-PORT 53.

On the other hand, when the indication of the forced end according to the latter mode is written, the MSC 62 executes the forced end process immediately after completion of the transmission and reception if the transmission and reception are being made, without monitoring the progress situation of the processing of the S-PORT 51 and the R-PORT 53. In other words, the processing state of the S-PORT 51 is forcibly set to the "C State" described above, and the processing state of the R-PORT 53 is forcibly set to the "C State" described above.

As described above, when performing a message communication among a plurality of processing modules forming a loosely coupled multiprocessing system in a message control system for a data communication system according to the present invention, it is possible to make a transmitting side initiated message communication control in which the message can be received when requested by the transmitting side, and the system is suited for executing efficient data processing in the data communication system.

We claim:

1. A message control system for a data communication system which employs a system structure in which a plurality of processing modules are connected to each other via a system bus, each of the processing modules includes a central processing unit, a memory unit which is only accessible by the central processing unit, and a connection unit which forms an interface between said memory unit and the system bus, said message control system comprising:

said memory unit in the processing modules including:

a data processing part which includes software running on the central processing unit for executing a data processing; and a buffer in which a transmitting message is expanded and stored;

the connection unit in the processing modules including:

a logical transmitting port operatively connected to said buffer which is provided as a communication port for said data processing part and successively reads out the message expanded in said buffer and transmits the same to a receiving side of the processing modules;

a logical receiving port, operatively connected to said data processing part, provided as a communication port for said data processing part and successively stores the message which is received from a transmitting side of the processing modules, and is logically connected in said buffer within its own memory unit;

transmission system connecting means for setting or releasing a logical connection between said logical transmitting port and the processing modules at a communicating destination;

reception system connecting means for setting or releasing the logical connection between said logical receiving port and the processing modules at the communicating destination;

transmitting side fault generation monitoring means for releasing the logical connection of said transmission system connecting means and notifying said data processing part of one of its own processing modules fault generation if one of a fault related to the transmitting message and a fault related to a message reception result for the receiving side processing module is generated when one of its own processing modules is the message transmitting side; and receiving side fault generation monitoring means for releasing the logical connection of said reception system connecting means and notifying said data processing part of one of its own processing modules fault generation if one of a fault is generated during processing of the received message and a fault indicating a message reception result is generated when one of its own processing modules is the message receiving side.

2. The message control system as claimed in claim 1, wherein said transmitting side fault generation monitoring means includes means for releasing the logical connection of said transmission system connecting means and notifying said data processing part of one of its own processing modules fault generation when an internal fault related to the processing of the transmitting message is generated, said data processing part makes said logical transmitting port transmit a message block of a protocol violation in response to the notification of said fault generation; and said receiving side fault generation monitoring means releases the logical connection of said reception system connecting means and notifies a reception result to said data processing part when the message block of said protocol violation is received by said logical receiving port.

3. The message control system as claimed in claim 1, wherein said transmitting side fault generation monitoring means comprises means for releasing the logical connection of said transmission system connecting means and notifying said data processing part of one of its own processing modules fault generation when a fault is generated on the system bus during transfer of the transmitting message, said data processing part makes said logical transmitting port transmit a message block of a protocol violation in response to the notification of said fault generation; and said receiving side fault generation monitoring means releases the logical connection of said reception system connecting means and notifies said data processing part of a reception result when the message block of said protocol violation is received by said logical receiving port.

4. The message control system as claimed in claim 1, wherein said receiving side fault generation monitoring means notifies said fault generation to said data processing part within one of its own processing modules when an internal fault related to the processing of the received message is generated, and releases the logical connection of said reception system connecting means when transmitting a status indicating said fault generation to said message transmitting side processing module via said logical transmitting port, and said transmitting side fault generation monitoring means releases the logical connection of said transmission system connecting means according to the detection result of said status.

5. The message control system as claimed in claim 1, wherein said receiving side fault generation monitoring means releases the logical connection of said reception system connecting means and notifies said data processing part of one of its own processing modules fault generation when a fault is generated on the system bus during transfer of the status, and said connection unit within said transmitting side processing module notifies the fault generation to said data processing part of one of its own processing modules and releases the logical connection of said transmission system connecting means when no status is input for a predetermined time.

6. The message control system as claimed in claim 1, wherein said receiving side fault generation monitoring means comprises means for notifying the generation of an internal fault with respect to said data processing part of one of its own processing modules and releases the logical connection of said reception system connecting means when the internal fault related to the processing of the received message after status transfer, and for transmitting a status of a protocol violation when the protocol violation of a message block which is thereafter received is detected, and wherein said transmitting side fault generation monitoring means releases the logical connection of said transmission system connecting means according to the detection result of said status and notifies the fault generation to said data processing part of one of its own processing modules.

7. The message control system as claimed in claim 1, wherein said receiving side data processing part monitors a reception process state of said logical receiving port, requests a forced end to said logical receiving port and releases the logical connection state of said reception system connecting means when a message block waiting state continues for a predetermined time.

8. The message control system as claimed in claim 1, wherein said connection unit includes one or more physical transmitting ports for managing a transmission protocol to the system bus and one or more physical receiving ports for managing a reception protocol from the system bus, said transmission system connecting means logically connects said logical transmitting port and said physical transmitting port, and said reception system connecting means logically connects said logical receiving port and said physical receiving port.

9. The message control system as claimed in claim 1, wherein said connection unit includes:
   said logical transmitting port and said logical receiving port;
   a physical transmitting port;
   a physical receiving port for respectively controlling transmission and reception of the message;
   an access control unit for processing an interface between said internal bus and one of said logical transmitting port and said logical receiving port;
   a memory access control unit connected to said memory unit for accessing said memory unit;
   a transmission control unit for controlling timing of said system bus in accordance with a transmission request from said physical transmitting port;
   a reception control unit for controlling timing of said system bus when the message from said system bus is received;
   a main sequence control unit for managing control of said connection unit; and
   a memory which is used as a work area of said main sequence control unit.

10. A message control system for a data communication system which employs a system structure in which a plurality of processing modules including a receiving side processing module and a transmitting side processing module are connected to each other via a system bus, said processing module including:
    a central processing unit;
    a memory unit which is only accessible by said central processing unit; and
    a connection unit which forms an interface between said memory unit and the system bus, when said memory unit of said receiving side processing module and said transmitting side processing module includes:
       a data processing part which is a software running on said central processing unit; and
       a buffer in which a transmitting message is expanded and stored;
    and said connection unit of said receiving side processing module and said transmitting side processing module includes:
       a logical transmitting port provided as a communication port for said data processing part and successively reads out the message expanded in said buffer to transmit the same to the receiving side processing module which is logically connected;
       a logical receiving port provided as a communication port for said data processing part and successively stores the message which is received from the transmitting side processing module which is logically connected in said buffer within said memory unit;
       transmission system connecting means for setting and releasing the logical connection between said logical transmitting port and one of the receiving side and transmitting side processing modules at a communicating destination;
       reception system connecting means for setting and releasing the logical connection between said logical receiving port and one of the receiving side and transmitting side processing modules at the communicating destination;
       transmitting side fault generation monitoring means for releasing the logical connection of said transmission system connecting means and notifying a fault generation to said data processing part of one of the receiving side and transmitting side processing modules if a fault related to the transmitting message or a fault related to the reception of a status indicating a message reception result from the receiving side processing module is generated when one of the receiving side and transmitting side processing modules is the message transmitting side;
       receiving side fault generation monitoring means for releasing the logical connection of said reception system connecting means and notifying a fault generation to said data processing part of one of the receiving side and transmitting side processing modules if one of a fault is generated during processing of the received message and a fault related to a status transfer indicating a message reception result is generated when one of the receiving side and transmitting side processing modules is the message receiving side;
       detecting means for detecting a forced end indication from said data processing part;
       transmission forced end means for forcibly ending the transmission process of said logical transmitting port when said detecting means detects the forced end indication of the transmission process; and
       reception forced end means for forcibly ending the reception process of said logical receiving port when said detecting means detects the forced end indication of the reception process.

11. The message control system as claimed in claim 10, wherein said detecting means detects an immediate forced end indication and a non-immediate forced end indication as the forced end indication of the transmission process, and wherein said transmission forced end means immediately ends the transmission process when said detecting means detects the immediate forced end indication of the transmission process, and ends the transmission process at an end time of the transmission process where the message breaks when said detecting means detects the non-immediate forced end indication of the transmission process.

12. The message control system as claimed in claim 10, wherein said detecting means detects an immediate forced end indication and a non-immediate forced end indication as the forced end indication of the reception process, and wherein said reception forced end means immediately ends the reception process when said detecting means detects the immediate forced end indication of said reception process and ends the reception process at an end time of said reception process where the message breaks when said detecting means detects the non-immediate forced end indication of said reception process.

13. The message control system as claimed in claim 10, wherein
said transmitting side fault generation monitoring means releases the logical connection of said transmission system connecting means and notifies said fault generation to said data processing part of its own processing module when an internal fault related to the processing of the transmitting message is generated, said data processing part making said logical transmitting port transmit a message block of a protocol violation in response to the notification of said fault generation, and wherein
said receiving side fault generation monitoring means releases the logical connection of said reception system connecting means and notifies a reception result to said data processing part when the message block of said protocol violation is received by said logical receiving port.

14. The message control system as claimed in claim 10, wherein
said transmitting side fault generation monitoring means releases the logical connection of said transmission system connecting means and notifies said fault generation to said data processing part of its own processing module when a fault is generated on the system bus during transfer of the transmitting message, said data processing part making said logical transmitting port transmit a message block of a protocol violation in response to the notification of said fault generation, and wherein
said receiving side fault generation monitoring means releases the logical connection of said reception system connecting means and notifies a reception result to said data processing part when the message block of said protocol violation is received by said logical receiving port.

15. The message control system as claimed in claim 10, wherein said receiving side fault generation monitoring means notifies said fault generation to said data processing part within its own processing module when an internal fault related to the processing of the received message is generated, and releases the logical connection of said reception system connecting means when transmitting a status indicating said fault generation to said message transmitting side processing module via said logical transmitting port (21), and said transmitting side fault generation monitoring means releases the logical connection of said transmission system connecting means according to a detection result of said status.

16. The message control system as claimed in claim 10, wherein said receiving side fault generation monitoring means releases the logical connection of said reception system connecting means and notifies said fault generation to said data processing part of its own processing module when a fault is generated on said system bus during transfer of the status, and said connection unit within said message transmitting side processing module notifies the fault generation to said data processing part of its own processing module and releases the logical connection of said transmission system connecting means when no status is input for a predetermined time.

17. The message control system as claimed in claim 10, wherein said receiving side fault generation monitoring means comprises means for notifying the generation of an internal fault with respect to said data processing part of its own processing module and releases the logical connection of said reception system connecting means when the internal fault is related to the processing of the received message after status transfer, and for transmitting a status of a protocol violation when the protocol violation of a message block which is thereafter received is detected, and wherein said transmitting side fault generating monitoring means releases the logical connection of said transmission system connecting means according to a detection result of said status and notifies the fault generation to said data processing part of its own processing module.

18. The message control system as claimed in claim 10, wherein said receiving side data processing part monitors a reception process state of said logical receiving port, and requests a forced end to said logical receiving port and releases the logical connection state of said reception system connecting means when a message block waiting state continues for a predetermined time.

19. The message control system as claimed in claim 10, wherein said data communication system comprises a loosely coupled multiprocessing system.

20. A message control system for a data communication system comprising:
a system bus;
a plurality of processing modules connected to each other via said system bus, each of said processing modules including:
a central processing unit;
a memory unit accessible only by said central processing unit; and
a connection unit which forms an interface between said memory unit and said system bus,
said memory unit comprising:
a data processing part including software running on said central processing unit; and
a buffer in which a transmitting message is expanded and stored;
said connection unit comprising at least:
a receiving side processing module logically connected in said buffer;
a logical transmitting port provided as a communication port for said data processing part which successively reads out the message expanded in said buffer in divisions according to a transfer unit of said system bus to transmit the same to said receiving side processing module;
a transmitting side processing module logically connected in said buffer;
a logical receiving port provided as a communication port for said data processing part and successively stores the message which is received from said transmitting side processing module;
transmission system connecting means for setting or releasing the logical connection between said logical transmitting port and said one of said transmitting and receiving side processing modules at a communicating destination;
reception system connecting means for setting and releasing the logical connection between said logical receiving port and said one of said transmitting and receiving side processing modules at the communicating destination;
transmitting side fault generation monitoring means for releasing the logical connection of said transmission system connecting means and notifying a fault generation to said data processing part of said one of said transmitting and receiving side processing modules if one of a fault related to the transmitting message and a fault related to the reception of a status indicating a message reception result from said receiving side processing module is generated when its own said transmitting side processing module is the message transmitting side;

receiving side fault generation monitoring means for releasing the logical connection of said reception system connecting means and notifying a fault generation to said data processing part of one of its own transmitting and receiving side processing modules if one of a fault is generated during processing of the received message and a fault related to a status transfer indicating a message reception result is generated when one of its own transmitting and receiving side processing modules is the message receiving side;

first connection information managing means for managing an identifier of said receiving side processing module which has a logical connection relationship to said logical transmitting port;

second connection information managing means for managing an identifier of said transmitting side processing module which has a logical connection relationship to said logical receiving port;

block identifier adding means for adding to the message block which is transmitted via said logical transmitting port a block identifier for identifying a block value of said message block; and anticipated block identifier managing means for managing an anticipated value of a block identifier of the received message of said logical receiving port.

21. The message control system as claimed in claim 20, wherein said block identifier adding means successively adds a first identifier which indicates a start of the message to a second identifier which indicates a middle message block and a third identifier which indicates a last message block to each message block which is transmitted in division according to a transfer unit of said system bus if the transmitting message block is greater than the transfer unit of said system bus.

22. The message control system as claimed in claim 20, wherein said block identifier adding means address a block identifier which indicates a single block to the message block if the transmitting message block is smaller than a transfer unit of said system bus.

23. The message control system as claimed in claim 20, wherein said block identifier adding means address a block identifier which indicates a last block to a last divided message block as it is even if the last divided message block out of the divided message blocks obtained by dividing the transmitting message according to a transfer unit of said system bus is smaller than said transfer unit.

24. The message control system as claimed in claim 21, wherein said block identifier adding means adds a fourth identifier which indicates a last block to the message block at a start of a re-transmission when said data processing part makes the re-transmission of the message block at the generation of a fault, and transmits it as a protocol violation message block to said receiving side processing module.

25. The message control system as claimed in claim 21, wherein said connection unit transmits the divided message block as it is even if it is smaller than a transfer unit of said system bus when the message is distributed and stored in more than one said buffer and the message block which is transmitted in divisions according to said transfer unit reaches a final region of each said buffer.

26. The message control system as claimed in claim 20, wherein said anticipated block identifier managing means detects a fault generation if a message block added with a block identifier other than said anticipated block identifier is received from said transmitting side processing module which has the logical connection relationship.

27. The message control system as claimed in claim 20, wherein said anticipated block identifier managing means has a first block identifier of the message block as the anticipated value by a re-reception process of said data processing part when a fault is generated in said receiving side processing module.

28. The message control system as claimed in claim 20, wherein said transmitting side fault generation monitoring means comprises means for releasing the logical connection of said transmission system connecting means and for notifying a fault generation to said data processing part of one of said transmitting and receiving side processing modules when an internal fault related to the processing of the transmitting message is generated, said data processing part making said logical transmitting port transmit a message block of a protocol violation in response to the notification of said fault generation; and wherein said receiving side fault generation monitoring means (26) releases the logical connection of said reception system connecting means and notifies a reception result to said data processing part when the message block of said protocol violation is received by said logical receiving port.

29. The message control system as claimed in claim 20, wherein said transmitting side fault generation monitoring means includes means for releasing the logical connection of said transmission system connecting means and for notifying said fault generation to said data processing part of one of said transmitting and receiving side processing modules when a fault is generated on said system bus during transfer of the transmitting message, said data processing part making said logical transmitting port transmit a message block of a protocol violation in response to the notification of said fault generation; and wherein said receiving side fault generation monitoring means releases the logical connection of said reception system connecting means and notifies a reception result to said data processing part when the message block of said protocol violation is received by said logical receiving port.

30. The message control system as claimed in claim 20, wherein said receiving side fault generation monitoring means notifies said fault generation to said data processing part within one of said transmitting and receiving side processing modules when an internal fault related to the processing of the received message is generated, and releases the logical connection of said reception system connecting means when transmitting a status indicating said fault generation to said message transmitting side processing module said logical transmitting port, and said transmitting side fault generation monitoring means releases the logical connection of said transmission system connecting means according to a detection result of said status.

31. The message control system as claimed in claim 20, wherein said receiving side fault generation monitoring means releases the logical connection of said reception system connecting means and notifies said fault generation to said data processing part of one of said transmitting and receiving side processing modules when a fault is generated on said system bus during transfer of the status, and said connection unit within said message transmitting side processing module notifies the fault generation to said data processing part of one of said transmitting and receiving side processing modules and releases the logical connection of said transmission system connecting means when no status is input for a predetermined time.

32. The message control system as claimed in claim 20, wherein said receiving side fault generation monitoring means comprises means for notifying the generation of an internal fault with respect to said data processing part of one of said transmitting and receiving side processing modules and releases the logical connection of said reception system connecting means when the internal fault is related to the processing of the received message after status transfer, and for transmitting a status of a protocol violation when the protocol violation of a message block which is thereafter received is detected by said anticipated block identifier managing means, and said transmitting side fault generation monitoring means releases the logical connection of said transmission system connecting means according to a detection result of said status and notifies the fault generation to said data processing part of one of said transmitting and receiving side processing modules.

33. The message control system as claimed in claim 20, wherein said receiving side data processing part monitors a reception process state of said logical receiving port, and requests a forced end to said logical receiving port and releases the logical connection state of said reception system connecting means when a message block waiting state continues for a predetermined time.

34. The message control system as claimed in claim 20, wherein the data communication system comprises a loosely coupled multiprocessing system.

* * * * *

UNITED STATES PATENT AND TRADEMARK OFFICE
CERTIFICATE OF CORRECTION

PATENT NO.   : 5,410,650
DATED        : April 25, 1995
INVENTOR(S)  : Sasaki et al.

It is certified that error appears in the above-indentified patent and that said Letters Patent is hereby corrected as shown below:

Title page, item [75], change "Horihide" to --Hirohide--.

Column 4, line 29, after "present" insert --invention--.

Column 11, line 64, delete "is to".

Column 12, line 15, change "FILL.BF" to --FILL·BF--;

line 21, change "FILL.BF" to --FILL·BF--.

Column 13, line 45, change "output" to --outputs--.

Column 15, line 19, change ".field" to --field--.

Column 23, line 54, change "400" to --$40_0$--.

Column 24, line 35, change "OS $_s$" to --$OS_s$--.

Signed and Sealed this

Twenty-fifth Day of July, 1995

Attest:

BRUCE LEHMAN

*Attesting Officer*    *Commissioner of Patents and Trademarks*